United States Patent
Utsunomiya et al.

(10) Patent No.: US 11,693,606 B2
(45) Date of Patent: Jul. 4, 2023

(54) IMAGE FORMING APPARATUS CONTROLLING INPUT FROM A FIRST INPUT DEVICE OR A SECOND INPUT DEVICE BASED ON WHICH IS CONNECTED TO THE IMAGE FORMING APPARATUS

(71) Applicant: CANON KABUSHIKI KAISHA, Tokyo (JP)

(72) Inventors: Takehito Utsunomiya, Ibaraki (JP); Minoru Akazawa, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/387,677

(22) Filed: Jul. 28, 2021

(65) Prior Publication Data

US 2021/0357157 A1    Nov. 18, 2021

Related U.S. Application Data

(63) Continuation of application No. PCT/JP2020/005012, filed on Feb. 4, 2020.

(30) Foreign Application Priority Data

Feb. 5, 2019  (JP) .................. 2019-018769
Feb. 5, 2019  (JP) .................. 2019-018772

(51) Int. Cl.
  *G06F 3/02*   (2006.01)
  *G06F 3/12*   (2006.01)

(52) U.S. Cl.
  CPC .......... *G06F 3/1203* (2013.01); *G06F 3/1258* (2013.01); *G06F 3/1284* (2013.01)

(58) Field of Classification Search
  CPC ........ G06F 3/02; G06F 3/0227; G06F 3/1236; G06F 15/0225; G06F 1/1669; H04N 1/00384; H04N 1/00557

(Continued)

(56) References Cited

U.S. PATENT DOCUMENTS 8,352,763 B2   1/2013  Imine
8,593,672 B2   11/2013 Aoyama et al.

(Continued)

FOREIGN PATENT DOCUMENTS

JP   2006-239869 A    9/2006
JP   2010-262454 A   11/2010
JP   2014-22927 A     2/2014

OTHER PUBLICATIONS

International Search Report dated Mar. 31, 2020 in corresponding PCT Application No. PCT/JP2020/005012 (English Translation Included).

(Continued)

*Primary Examiner* — Jamares Q Washington
(74) *Attorney, Agent, or Firm* — Venable LLP

(57) ABSTRACT

In an image forming apparatus, in a case that a connected numerical key unit is a dedicated numerical key unit including a numerical key portion for executing, as predetermined processing, numerical value input processing for inputting information on a numerical value and including an operation key portion and a setting key portion for executing, as predetermined processing, another input processing for inputting information on an operation of the image forming apparatus other than the numerical value input processing (step S12; YES), a controller executes the predetermined processing in a case that either of the respective key portions is operated (step S13). On the other hand, in a case that the connected numerical key unit is a general-purpose numerical key unit different from the dedicated numerical key unit (Continued)

(step S1; NO), the controller executes the predetermined processing only in a case that the numerical key portion is operated (step S14).

25 Claims, 17 Drawing Sheets

(58) Field of Classification Search
USPC .......................... 358/1.15, 1.13; 399/81, 90
See application file for complete search history.

(56) References Cited

U.S. PATENT DOCUMENTS

| | | | |
|---|---|---|---|
| 2008/0195762 A1* | 8/2008 | Wood | G06F 3/0231 710/1 |
| 2011/0128247 A1* | 6/2011 | Sensu | G06F 3/0227 345/173 |
| 2020/0076966 A1* | 3/2020 | Shimadate | H04N 1/00408 |
| 2020/0393927 A1 | 12/2020 | Akazawa | |
| 2021/0337077 A1 | 10/2021 | Utsunomiya | |

OTHER PUBLICATIONS

U.S. Appl. No. 17/464,160, filed Sep. 1, 2021, by Minoru Akazawa.

* cited by examiner

150

| INPUT CODE | OUTPUT CODE | OUTPUT ATTRIBUTE |
|---|---|---|
| 0 x 27 | "0" | CHARACTER |
| 0 x 1E | "1" | CHARACTER |
| 0 x 1F | "2" | CHARACTER |
| 0 x 25 | "8" | CHARACTER |
| 0 x 26 | "9" | CHARACTER |
| 0 x 04 | "START" | JOB |
| 0 x 05 | "STOP" | JOB |
| 0 x 06 | "RESET" | JOB |
| 0 x 1B | "1ST SETTING" | JOB |
| 0 x 1C | "2ND SETTING" | JOB |
| 0 x 1D | "3RD SETTING" | JOB |

| INPUT CODE | OUTPUT CODE | OUTPUT ATTRIBUTE |
|---|---|---|
| 0 x 27 | "0" | CHARACTER |
| 0 x 1E | "1" | CHARACTER |
| 0 x 1F | "2" | CHARACTER |
| 0 x 25 | "8" | CHARACTER |
| 0 x 26 | "9" | CHARACTER |
| 0 x 04 | "A" | CHARACTER |
| 0 x 05 | "B" | CHARACTER |
| 0 x 06 | "C" | CHARACTER |
| 0 x 1B | "X" | CHARACTER |
| 0 x 1C | "Y" | CHARACTER |
| 0 x 1D | "Z" | CHARACTER |

| KEY CODE | DEFAULT | SETTING VALUE |
|---|---|---|
| 0x57(+) | NULL | RETURN TO HOME SCREEN |
| 0x56(−) | NULL | INPUT "#" |
| 0x55(*) | INPUT "*" | INPUT "*" |
| 0x63(.) | NULL | NULL |
| 0x54(/) | NULL | STOP JOB |
| 0x2A(BS) | CLEAR CHARACTER | CLEAR CHARACTER |
| 0x28(Enter) | NULL | START JOB |

Fig. 11

IMAGE FORMING APPARATUS CONTROLLING INPUT FROM A FIRST INPUT DEVICE OR A SECOND INPUT DEVICE BASED ON WHICH IS CONNECTED TO THE IMAGE FORMING APPARATUS

This application is a continuation of International Patent Application No. PCT/JP2020/005012, filed Feb. 4, 2020, which claims the benefit of Japanese Patent Application No. 2019-018769, filed Feb. 5, 2019, and Japanese Patent Application No. 2019-018772, filed Feb. 5, 2019, the contents of each of which is incorporated by reference herein.

TECHNICAL FIELD

The present invention relates to an image forming apparatus to which an input device including a hardware key and to be externally connectable.

BACKGROUND ART

Conventionally, for example, an image forming apparatus of an electrophotographic type has been widely used as a copying machine, a printer, a facsimile (machine), a multi-function machine having a plurality of functions of these (machines), and the like. In such an image forming apparatus, in order to permit a user to perform input of numerical values such as the number of image formed sheets and a facsimile number or input of processing such as a start, a stop, or the like of image forming processing, for example, an operating portion (display portion) capable of displaying and inputting information on a front side upper portion of an apparatus main assembly is provided. As such an operating portion, for example, one provided with a touch panel where input keys (software keys) are displayed on a display screen and with hardware keys such as numerical keys, a start key, and a stop key has become widespread. The hardware keys are, for example, disposed adjacent to the touch panel.

In the image forming apparatus provided with an operating portion, when the number of sheets subjected to copying and a designation number (telephone number/FAX number) of facsimile are inputted, for example, a numerical key portion as software keys including numerical values from 0 to 9 is displayed on a touch panel. A user performs a touch operation at a numerical key portion of the touch panel, so that the user is capable of performing input of setting of the number of sheets subjected to copying and input of the designation number to the image forming apparatus. When a numeric displayed on the touch panel is touch-operated by the user, a controller acquires coordinate data, of a touched portion by the user, from the touch panel, and converts the coordinate data into numerical (value) information, and then executes a predetermined operation depending thereon.

However, when the input is carried out on the touch panel for receiving the numerical value input by the touch operation, the user cannot feel a physical sense of pushing-down. For this reason, the user performs an input operation while the user confirms the input one numeric by one numeric while looking at the display screen of the touch panel, so that improvement in operating property has been desired. In order to solve this, an image forming apparatus to which an input device (for example, a numerical key unit or a full-keyboard unit) including a numerical key portion comprised of physical hardware keys is externally connectable has been developed (see Japanese Laid-Open Patent Application (JP-A) 2014-22927). To this image forming apparatus, the user externally connects the input device and pushes down a hardware key of the numerical key portion of the input device, whereby the user is capable of inputting the number of sheets subjected to copying, the designation number of the facsimile, and the like.

Problems to be Solved by the Invention

However, in the image forming apparatus described in the above-described JP-A 2014-22927, in the case where there is an input device dedicated to the image forming apparatus, in general, an appropriate key code is assigned to each of keys of the dedicated input device. Further, the image forming apparatus is capable of controlling respective portions of the image forming apparatus on the basis of the key code outputted by operating the dedicated input device. On the other hand, on the image forming apparatus, an input device other than the dedicated input device, i.e., a so-called general-purpose input device is mounted in some instances. In this case, key codes assigned to the general-purpose input device and key codes assigned to the dedicated input device are the same at numerical key portions capable inputting numerical values but are not necessarily be the same at portions other than the numerical key portions. For this reason, in the case where the general-purpose input device is mounted on the image forming apparatus, when the image forming apparatus carries out control on the basis of the key code of the dedicated input device, there is a liability that the image forming apparatus malfunctions which is not intended by the user.

It is an object of the present invention is to provide an image forming apparatus capable of suppressing that in the image forming apparatus to which a plurality of input devices are connectable, in the case where a connected input device is operated, the input device malfunctions.

Means for Solving the Problem

The image forming apparatus of the present invention is an image forming apparatus comprising: an image reading device for reading an image of an original; an image forming portion for forming an image on a recording medium on the basis of a reading result of the image reading portion; an operating panel including a display screen capable of displaying, as software keys, a software numerical key portion for inputting each of numerical information of 0 to 9 and a software execution key portion for providing an instruction of a start of image reading to the image reading device; a connecting portion to which a first input device including a first numerical key portion where a plurality of numerical keys for inputting numerical information of 0 to 9, respectively, by being pushed down as hardware keys are disposed in a telephone type arrangement and including a hardware execution key portion for providing an instruction of a start of reading the original image to the image reading portion by being pushed down as the hardware keys, or a second input device including a second numerical key portion where a plurality of numerical keys for inputting numerical information of 0 to 9, respectively, by being pushed down as hardware keys are disposed in an electronic calculator type arrangement and including an arithmetic operation key portion for inputting data on four arithmetic operations by being pushed down as the hardware keys, is connectable; and a controller for controlling the image forming apparatus so that an input operation by the first numerical key portion or the execution key portion is permitted in a case that the first input device is connected to the connecting portion, and so that an input operation by the second numerical key portion is permitted and an input operation other than the input operation by the second numerical key portion is made invalid.

Effect of the Invention

According to the present invention, it is possible to solve the various problems in the case where the general-purpose input device is connected to the image forming apparatus.

BRIEF DESCRIPTION OF THE DRAWINGS

FIG. 6 is an illustration showing a code conversion table applied in the case where the dedicated numerical key unit is connected to the image forming apparatus according to this embodiment.

FIG. 7 is an illustration showing a code conversion table applied in the case where the general-purpose numerical key unit is connected to the image forming apparatus according to this embodiment.

FIG. 11 is an illustration showing a key assignment table of the image forming apparatus according to the second embodiment.

EMBODIMENTS FOR CARRYING OUT THE INVENTION

Figure 1:
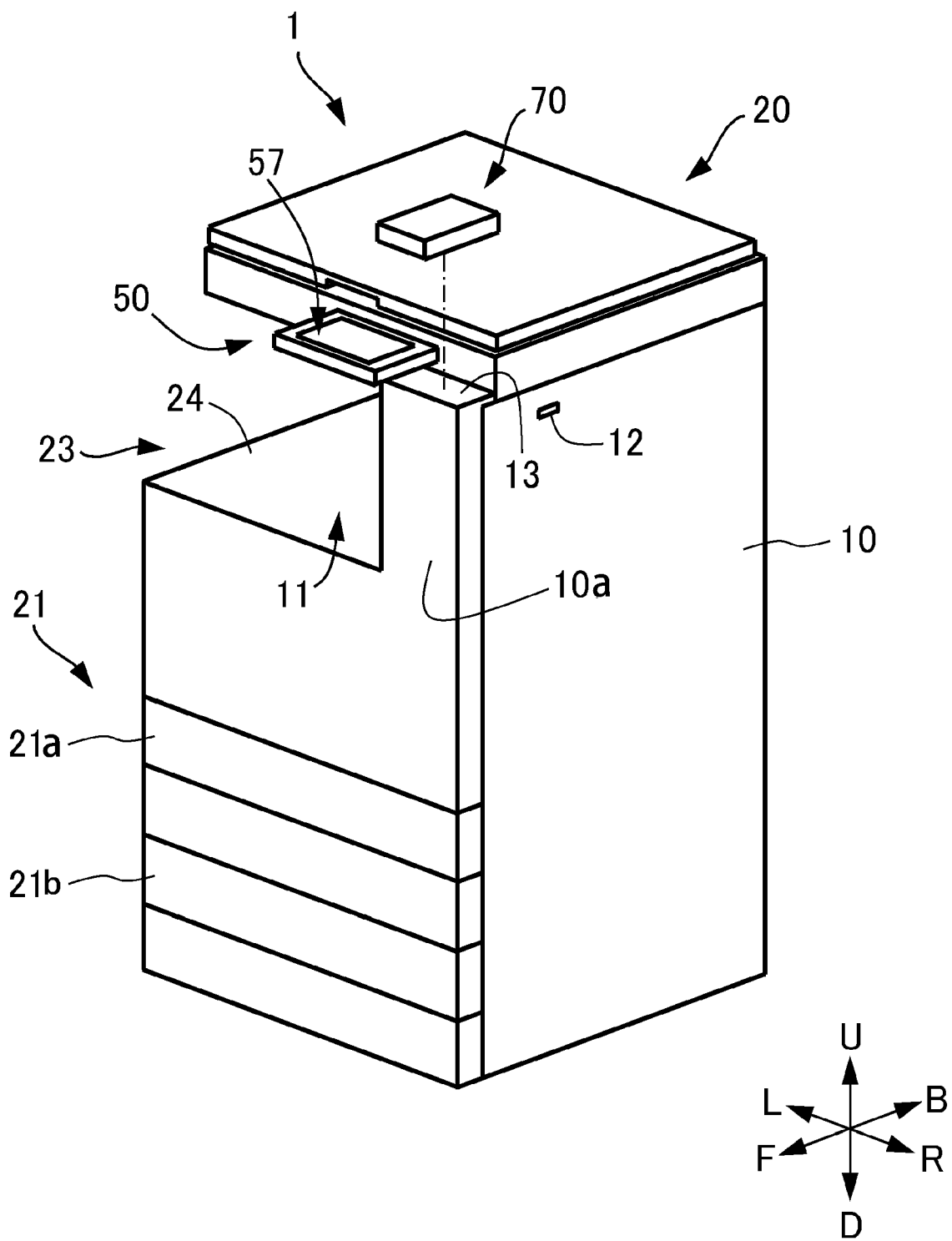
FIG. 1 is a perspective view showing a schematic structure of an image forming apparatus according to this embodiment.

In the following, an embodiment of an image forming apparatus which is an example of the present invention will be specifically described with reference to FIGS. 1 to 9. Incidentally, in this embodiment, as shown in each of the figures, toward an image forming apparatus 1, a front side is represented by a front side F, a rear side (rear) is represented by a back side B, a left(-hand) side is represented by L, a right(-hand) side is represented by R, an upper (upward) side is represented by U, and a lower (downward) side is represented by D. Further, the image forming apparatus 1 is constituted so that a user is positioned from the front side F toward the back side B and performs various operations. As shown in FIG. 1, in this embodiment, a side where an operating portion 50 described later is provided is the front side F of the image forming apparatus 1.

In this embodiment, as an example of the image forming apparatus 1, a full-color printer of a tandem type is described. However, the present invention is not limited to one mounted on the image forming apparatus 1 of the tandem type but may also be one mounted on an image forming apparatus of another type, and further, the present invention is not limited to one for a full-color image, but may also be one for a monochromatic image or for a mono-color (single color) image. Or, the present invention can be carried out in various uses, such as printers, various printing machines, copying machines, facsimile machines and multi-function machines.

<Image Forming Apparatus>

As shown in FIG. 1, the image forming apparatus of this embodiment includes an image forming apparatus main assembly (hereinafter, referred to as an apparatus main assembly) 10. The apparatus main assembly 10 includes an image reading portion 20, a sheet feeding portion 21, an image forming portion 22 (see FIG. 2), a sheet discharging portion 23, a controller 30 (see FIG. 2) and an operating portion 50. As shown in FIG. 1, the operating portion 50 is provided above the sheet discharging portion 23. Incidentally, on the sheet as a recording material, a toner image is to be formed, and specific examples of the sheet may include plain paper, a resin-made material sheet as a substitute for the plain paper, thick paper, a sheet for an overhead projector, and the like.

The image reading portion 20 is, for example, a flat head scanner device, and is provided at an upper portion of the apparatus main assembly 10. The image reading portion 20 includes an unshown platen glass as an original mounting table, an unshown light source for irradiating an original, placed on the platen glass, with light, and an unshown image sensor for converting reflected light into a digital signal, and the like member. The sheet feeding portion 21 is disposed at a lower portion of the apparatus main assembly 10, and includes sheet cassettes 21*a* and 21*b* for stacking and accommodating the sheet such as recording paper, and feeds the sheet to the image forming portion 22 (see FIG. 2).

The image forming portion 22 is provided inside the apparatus main assembly 10 and includes image forming units each including an unshown developing device and an unshown photosensitive drum as an image bearing member, toner bottles, an intermediary transfer unit, a secondary transfer portion, a fixing device, and the like. The image forming portion 22 is capable of forming an image onto the sheet fed from the sheet feeding portion 21, on the basis of image information from a controller 30. The sheet discharging portion 23 includes a discharging tray 24 provided on a side downstream of an unshown discharge opening formed in the apparatus main assembly 10. The discharge tray 24 is a face-down tray, and the sheet discharged through the discharge opening is stacked on the discharge tray 24. Further, a space between the image reading portion 20 and the discharge tray 24 constitutes an in-body space portion 11.

<Controller>

Figure 2:
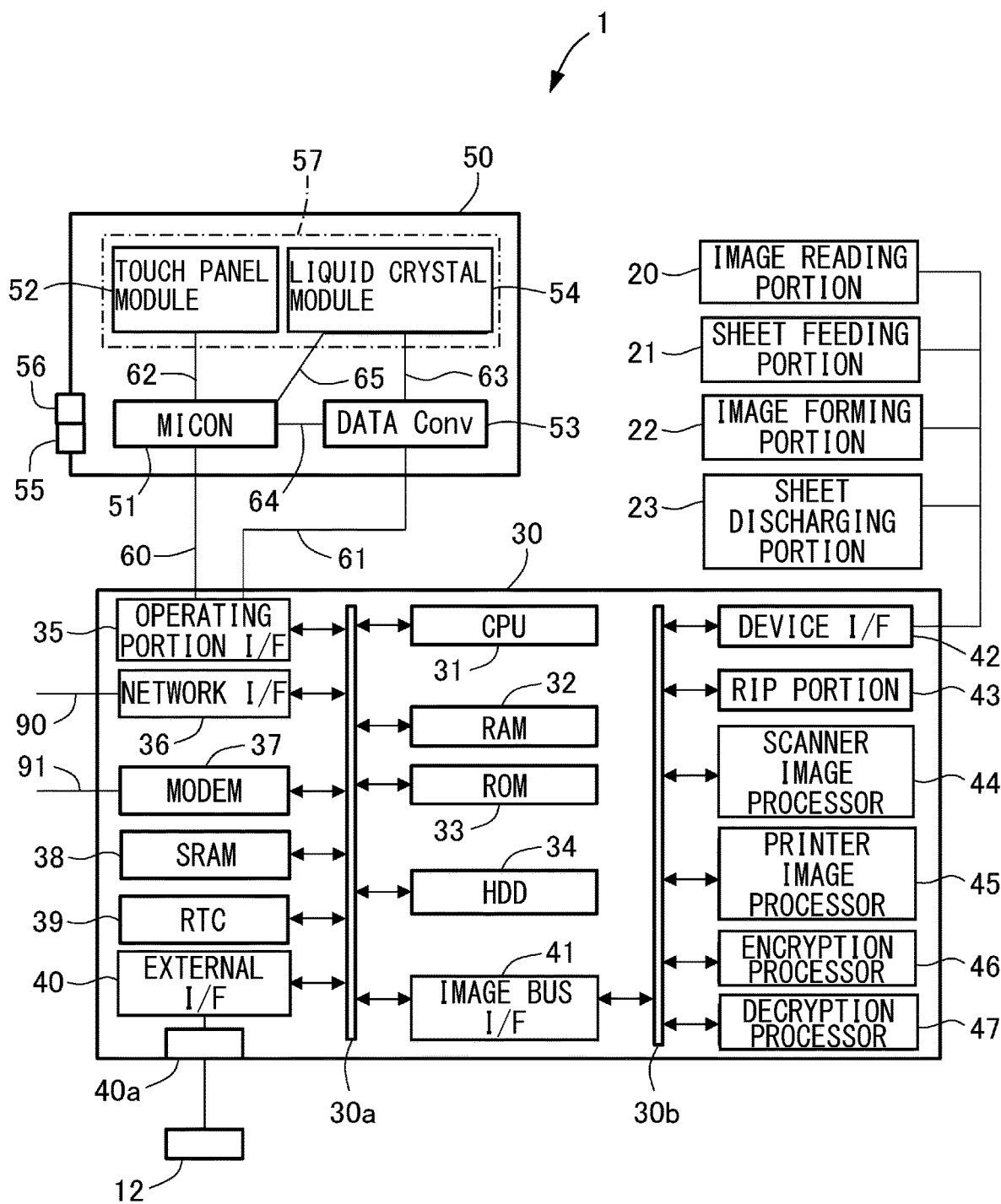
FIG. 2 is a control black diagram of the image forming apparatus according to this embodiment.

As shown in FIG. 2, the controller 30 is constituted by a computer, and for example, includes a CPU 31, a RAM 32 for temporarily storing data, a ROM 33 for storing a program for controlling respective portions, and an HDD 34. In this embodiment, the controller 30 includes a system bus 30a and an image bus 30b, and each of the CPU 31, the RAM 32, the ROM 33, and the HDD 34 is connected to the system bus 30a. The CPU 31 is a processor for carrying out integrated control of a entirety of the image forming apparatus 1 and is a main body of a system controller. The CPU 31 carries out, for example, image processing of image data for image formation and carries out network control, and in addition, controls image forming processing by not only outputting an instruction of image formation to the image forming portion 22 but also transmitting and receiving information between itself and the operating portion 50.

The RAM 32 is a system work memory for operating the CPU 31 and is also an image memory for temporarily storing the image data, and functions as a main memory, a work area, and the like of the CPU 31. In the RAM 32, setting information in the image forming apparatus 1, and a job log and an operation log when respective processes are performed are stored. In the ROM 33, an image formation control sequence or the like for forming an image on a sheet is stored. In this embodiment, the ROM 33 is, for example, a boot ROM and stores a boot program of a system. The HDD 34 is a hard disk drive and stores a system software, an application, the image data, and the like.

The controller 30 includes an operating portion input/output circuit (I/F) 35, a network input/output circuit (I/F) 36, a modem 37, an SRAM 38, an RTC 39, and an external input/output circuit (I/F) 40, which are each connected to the system bus 30b. The operating portion input/output circuit (I/F) 35 not only carries out transmission of the image data to an operating portion 50 described later and various communications from the operating portion 50 but also inputs, to the CPU 31, information inputted from the operating portion 50 by a user.

The network input/output circuit 36 is connected to a network 90 and carries out input/output of the information. Further, the modem 37 is connected to a public line (network) 91 and functions as a facsimile communication portion capable of transmitting and receiving facsimile, and carries out input/output of the information. By this, the controller 30 is capable of communicating with another PC and server, connected thereto, via the network 90 by the network input/output circuit 36 or via the public line 91 by the modem 37 under instruction of the CPU 31. That is, the image forming apparatus 1 is connected to the network 90 or the public line 91, and carries out input/output of image information and device information.

The SRAM 38 is a nonvolatile storing medium capable of high-speed operation. The RTC 39 is a real time clock, and performs processing in which a current time is continuously counted even in a state in which power is not supplied to the controller 30. The external input/output circuit 40 is a general-purpose input/output circuit such as USB and connects a general-purpose PC, a memory device, and a dedicated numerical key unit 70 described later via a USB connector 40a of a USB standard and a USB port (connecting portion) 12. Incidentally, the USB is an abbreviation of a Universal Serial Bus. The USB port 12 is, for example, a connector installed on a side surface or a front surface of an installation surface 13 (see FIG. 1), described later, where the dedicated numerical key unit 70 is installed, or on a side surface of the operating portion 50, and to the USB port 12, the dedicated numerical key unit 70 is connectable.

The controller 30 includes an image bus input/output circuit (I/F) 41. The image bus input/output (I/F) 41 is a bus bridge which connects the system bus 30a and the image bus 30b transferring the image data at high speed and which converts a data structure. The image bus 30b is constituted by, for example, a PCI bus or an IEEE 1394.

The controller 30 includes a device input/output circuit (I/F) 42, a RIP portion 43, a scanner image processing portion 44, an printer image processing portion 45, an encryption processing portion 46, and a decryption processing portion 47, which are each connected to the image bus 30b. The device input/output circuit 42 connects the image reading portion 20 and the image forming portion 22 to the controller 30 and performs a synchronous line and a non-synchronous line of the image data. The RIP portion 43 is a raster image processor and develops PDL data into a bit-mapped image. The scanner image processing portion 44 performs correction, processing and editing of the image data. The printer image processing portion 45 subjects print output image data to printer correction, resolution conversion, and the like. The encryption processing portion 46 subjects input data including the image data to encryption processing. The description processing portion 47 subjects encrypted data to description processing.

<Operating Portion>

Next, an example of a hardware constitution for controlling respective pieces of software of the operating portion (display portion) 50 will be described. The operating portion 50 includes a micon 51, a touch panel module 52, a data converter (Conv) 53, and a liquid crystal module 54. The operating portion 50 is connected to the controller 30 by a serial bus 60 for establishing communication with the CPU 31 and by a bus 61 for transferring data for being displayed on the liquid crystal module 54.

The micon 51 is a microcomputer for carrying out integrated control of entirety of the operating portion 50. Inside the micon 51, a ROM in which a program for operating the micon 51 is stored is mounted. The touch panel module 52 is disposed on a surface of the liquid crystal module 54, and by user's touch, the touch panel module 52 notifies the micon 51 of positional information of a touched portion via a touch panel communication bus 62. The operating portion 50 is capable of causing the liquid crystal module 54 to display software keys and the user is capable of inputting information by contact with the touch panel module 52. The touch panel module 52 is constituted by a touch panel device and a touch panel device controller. As a touch panel device, those of any types such as a resistive film type, an electrostatic capacity type, and an optical type of infrared radiation or the like may also be applied.

The data converter 53 is a module which receives the image data from the operating portion IN/output circuit 35 of the controller 30 via the bus 61 and which then converts the image data into data format which is capable of being received by the liquid crystal module 54. For example, from the controller 30, the data converter 53 receives data of standards such as Display Port and HDMI (registered trademark) and converts the data into LVDS and signal format of a CMOS level which are capable of being received by the liquid crystal module 54, and then inputs the converted data to the liquid crystal module 54 via a bus 63. Further, the data converter 53 is connected to the micon 51 by a bus 64, and also has a function of overwriting the image data sent from the controller 30 with the image data generated by the micon 51 at a predetermined position.

The liquid crystal module 54 is a module constituted by an LCD and a backlight module, and receives data from the data converter 53 via the bus 63 and then transfers the image data to the LCD at a timing determined in advance. At this time, by causing the backlight module to emit light, the image data transferred to the LCD is displayed as a visible image. Adjustment of brightness of the back light is performed by operating switches 55 and 56 dedicated for brightness adjustment accompanying the operating portion 50.

As shown in FIG. 1, the operating portion 50 is provided on a front side F than a central portion of the image forming apparatus 1 with respect to a front-rear direction and is provided at an upper portion of a front cover 10a which is a part of an outer casing cover of the apparatus main assembly 10. The operating portion 50 is formed in, for example, a rectangular flat plate shape, and is fixedly provided to the apparatus main assembly 10 with a panel surface 57, toward an upper side U, constituted by laminating the touch panel module 52 on the liquid crystal module 54 (see FIG. 2). The software keys displayed on the panel surface 57 are input keys for detecting input of keys to touch operation of each of display portions. Incidentally, the shape of the operating portion 50 is not limited to the rectangular flat plate shape, but may also be another shape. Further, a direction of the touch panel module 52 and the liquid crystal module 54 is not limited to the upper side U, but may also be another direction, and for example, these modules may also be provided so as to be tiltable in an up-down direction relative to the apparatus main assembly 10 and so that the direction of the touch panel module 52 and the liquid crystal module 54 is changeable.

On the right side R of the operating portion 50, the installation surface 13 facing toward the upper side U on the right side of the front side F of the apparatus main assembly 10 adjacent to the operating portion 50 is provided. On the installation surface 13, the general-purpose numerical key unit 200 or the dedicated numerical key unit 70 or the like is capable of being installed, and by installation, the general-purpose numerical key unit 200 or the dedicated numerical key unit 70 is disposed adjacent to the right side R of the operating portion 50 as viewed from the front side. In an outer casing of the apparatus main assembly 10, the USB port 12 is provided on the side surface of the right surface R of the installation surface 13, and the user is capable of carrying out USB connection to the USB port 12 by mounting external equipment having a USB terminal, such as the general-purpose numerical key unit 200 or the dedicated numerical key unit 70, an IC card reader, a USB memory, and the like.

<Numerical Key Unit>

Next, a hardware constitution and an operation of the dedicated numerical key unit 70 which is the input device connected to the image forming apparatus 1 will be described. This dedicated numerical key unit 70 not only includes a plurality of operation keys 100 but also is mounted on the image forming apparatus 1 including the operating portion 50 to which the information is capable of being inputted, and is capable is inputting information to the controller 30 of the image forming apparatus 1, separately from the operating portion 50. As an example of different uses for different purposes in information input between the operating portion 50 and the dedicated numerical key unit 70, setting of a density, a size, and the like relating to image formation is inputted from the operating portion 50, and numerical values such as the number of sheets subjected to the image formation and a designation number of a facsimile and the like are inputted from the dedicated numerical key unit 70. Incidentally, in the present specification, the numerical key is a concept including either of the case where the numerical key shows 10 numerical keys from 0 to 9, the case where the numerical key shows 12 keys in which "*" and "#" are added to the (10) numerical keys, and the case where the numerical key shows about 20 keys in which numerical keys include four arithmetic operators, a "NumLock", and the like.

Figure 3:
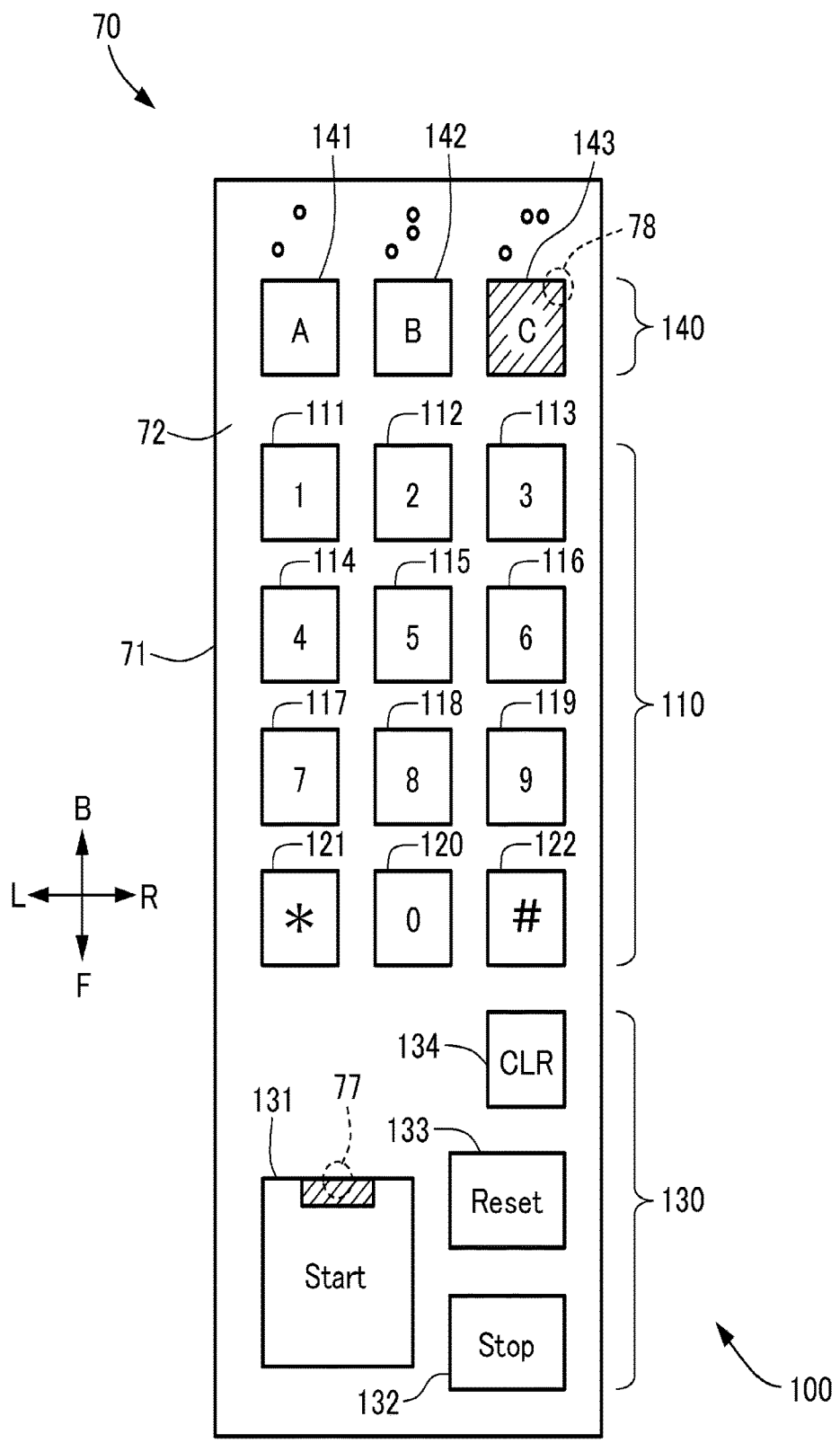
FIG. 3 is a top plan view of a dedicated numerical key unit of the image forming apparatus according to this embodiment.

As shown in FIG. 1 and FIG. 3, the dedicated numerical key unit 70 includes a casing 71, an upper cover 72 provided on an upper surface of the casing 71, and the operation keys 100 provided on the upper cover 72. An arrangement of the operation keys 100 will be described later. As shown in FIG. 1, the casing 71 is adjacent to the right side R of the operating portion 50 of the image forming apparatus and is mounted, for example, by screwing or bonding, on the installation surface 13 facing the upper side U on the right side R in the front side F of the apparatus main assembly 10. By this, the user can easily use the dedicated numerical key unit 70 by utilizing a right hand while looking at the operating portion 50.

Figure 4:
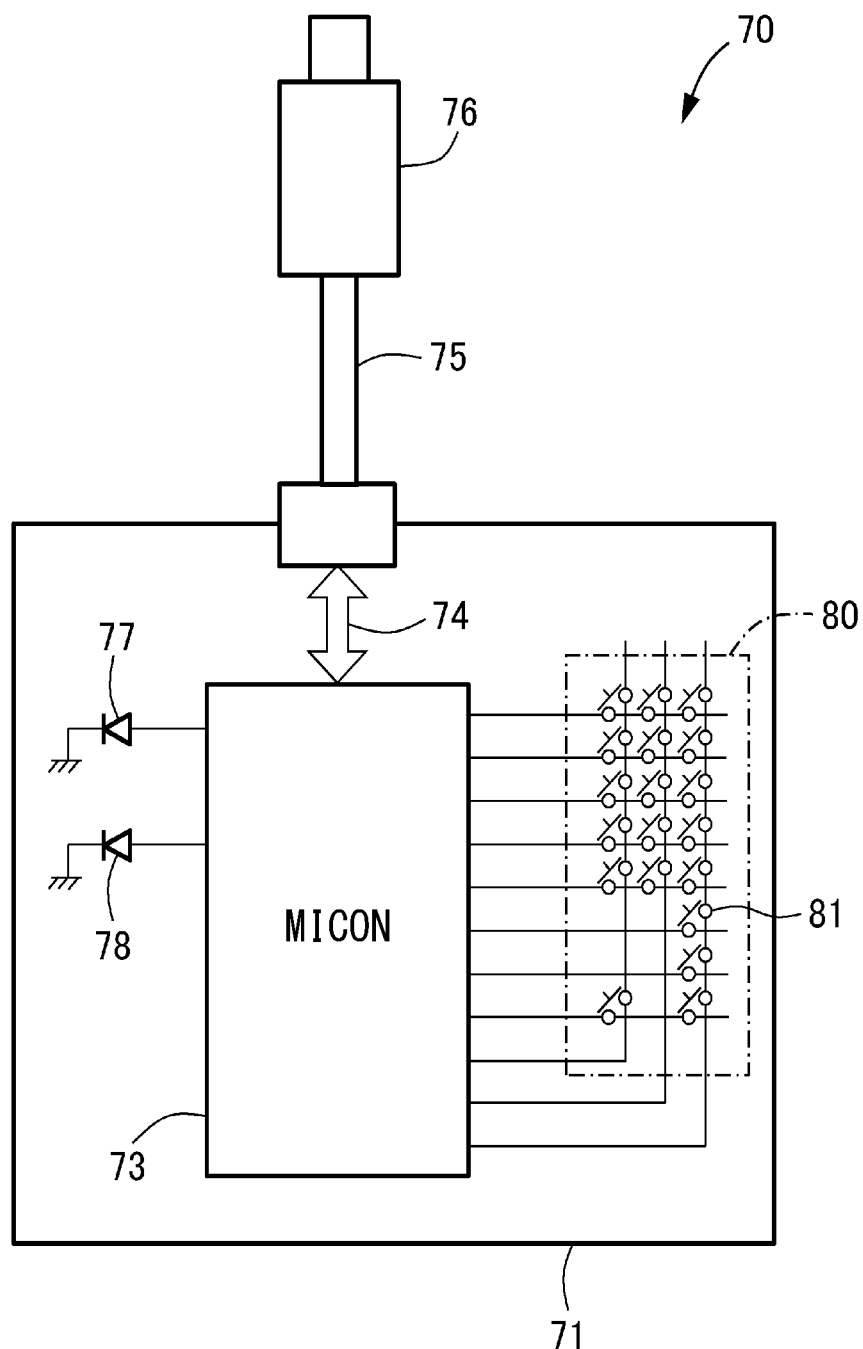
FIG. 4 is a control block diagram of the dedicated numerical key unit of the image forming apparatus according to this embodiment.

As shown in FIG. 4, the dedicated numerical key unit 70 includes a hardware key unit 80, a micon 73, an inner bus 74, a connecting cable 75, a USB connector 76 provided at a free end of the connecting cable 75, and LEDs 77 and 78. In this embodiment, for example, the inner bus 74 is a USB bus, the connecting cable 75 is a USB cable provided from the casing 71 to an outside, and the USB connector 76 is a USB terminal. By this, the image forming apparatus 1 and the dedicated numerical key unit 70 are electrically connected to each other the connecting cable 75.

Incidentally, in this embodiment, the connecting cable 75 has a constitution in which the connecting cable 75 is connected to a connector fixed to a substrate and cannot be dismounted from the dedicated numerical key unit 70. However, a mounting structure of the connecting cable 75 to the dedicated numerical key unit 70 is not limited thereto, and for example, the dedicated numerical key unit 70 is provided with a USB port connected to the inner bus 74, and the USB cable may also be connected to this USB port so as to be mounted in and dismountable from the USB port. Or, the USB cable is provided from the image forming apparatus 1 side, and a terminal of this USB cable may also be connected to the USB port connected to the inner bus 74 of the dedicated numerical key unit 70 so as to be mountable in and dismountable from the USB port.

The hardware key unit 80 includes a plurality of hardware keys. In this embodiment, in order to provide operation feeding (for example, click feeling) of the operation keys 100 to the user, as an example of the numerical keys, tactile switches 81 are supplied. The tactile switches 81 are disposed one by one at positions opposing the operation keys 100 (see FIG. 3), respectively, on an inside of the casing 71. The tactile switch 81 is constituted by, for example, a protective cover, a plunger pushed by the operation key 100, a reversing spring not only creating the click feeling but also functioning as a movable contact, and a base portion including two contacts. Incidentally, as the tactile switch 81, an existing or new appropriate constitution can be applied, and thus will be omitted from detailed description.

The micon 73 is capable of executing, for example, detection of input from the numerical key unit 80, lighting control of the plurality of LEDs 77 and 78, and USB communication between the micon 73 and the CPU 31 of the image forming apparatus 1 via the external input/output circuit 40 (see FIG. 2). The USB connector 76 is connected to the external input/output circuit 40 via the USB port 12 provided on the side surface of the apparatus main assembly 10 and the USB connector 40a (see FIG. 2). By this, the micon 73 and the controller 30 are USB-connected to each other via the connecting cable 75, and thus are capable of communicating with each other through an HID protocol for USB.

The micon 73 specified the tactile switch 81 pushed down and generates a code determined in advance in the case where the tactile switch 81 is pushed down by the user. The micon 73 sends the generated key code to the CPU 31 of the image forming apparatus 1 via the inner bus 74 and the connecting cable 75. The CPU 31 performs processing depending on the key inputted.

A first LED 77 is provided on a back side of a start key 131 (see FIG. 3) described later in the casing 71 and is caused to emit light by the micon 73 on the basis of a signal from the controller 30 (see FIG. 2). A second LED 78 is provided on a back side of a third setting key 143 (see FIG. 3) described later in the casing 71 and is caused to emit light by the micon 73 on the basis of a signal from the controller 30 (see FIG. 2).

Next, an arrangement of the operation keys 100 of the numeric key unit 70 will be described using FIG. 3. The operation keys 100 roughly includes, a numerical key portion (first numerical (value) key portion) 110, an operation key portion (first processing key portion) 130, and a setting key portion (first processing key portion) 140. Here, FIG. 3 illustrates the dedicated numerical key unit 70 as viewed from the front side and is a diagram of the numerical key unit 70 viewed from a direction parallel to a pushing (pressing)-down direction of each of the hardware keys. Incidentally, the front side view is a position where the numerical values provided on the hardware keys of the dedicated numerical key unit 70 are properly seen in the up-down direction.

The numerical key portion 110 includes a plurality of hardware keys for executing, as predetermined processing, numerical value input processing for inputting information on numerical values. In this embodiment, the numerical key portion 110 includes numerical (value) keys 111 to 120 for inputting numerical values of 0 to 9, a key 121 for inputting "*", and a key 122 for inputting "#". By an operation of the numerical keys 111 to 120, input of the number of copied sheets and a telephone number of a facsimile, or the like can be carried out. Incidentally, a numerical key 115 for inputting a numerical value of 5 is provided with a small projected portion at an upper surface thereof. By this, the user can discriminates the numerical key 115 by the sense of touch without looking at the key, so that it is possible to realize blind input of peripheral numerical keys 111 to 120 without directly looking at the keys.

Here, the dedicated numerical key unit 70 in this embodiment is a dedicated numerical key unit designed, for the image forming apparatus 1, as one of options of the image forming apparatus 1. Uses of this dedicated numerical key unit 70 are principally, for example, input of a designation number (FAX number) when facsimile transmission is made. The dedicated numerical key unit 70 is designed for principal purpose of inputting the designation number of the facsimile transmission, and therefore, an arrangement of the numerical key portion 110 is similar to an arrangement of a telephone. That is, the arrangement of the numerical key portion 110 of the dedicated numerical key unit 70 is similar to a standard arrangement shown in Recommendation E.161 of ITU-T (International Telecommunication Union-Telecommunication Standardization Sector). That is, as shown in FIG. 3, in the numerical key portion 110, the numerical keys 111 to 119 from 1 to 9 are adjacently disposed so that a rearmost side B includes 1 to 3, the front side F thereof includes 4 to 6 and a further front side F thereof includes 7 to 9. Further, on the front side F of the numerical key 118 of 8, the numerical key 120 of 0 is disposed, and the "*" key 121 and the "#" 122 are disposed on left and right sides thereof (of the "0" key). That is, the numerical key portion 110 is comprised of hardware keys in which the numerical key of 1 is arranged on the rear side than the numerical key of 9 as seen from the front side of the apparatus main assembly 10 in a state in which the dedicated numerical key unit 70 is mounted on the apparatus main assembly 10.

In other words, with respect to the 10 hardware keys from 0 to 9, a row of the numerical keys of 1, 2 and 3 is disposed on the rearmost side, and a row of the numerical keys of 4, 5 and 6 is disposed on a side in front of the row of 1, 2 and 3. Further, a row of the numerical keys of 7, 8 and 9 is disposed on a side in front of the row of the numerical keys 4, 5 and 6. Further, the hardware key of 0 is disposed on a side in front of the row of the hardware keys of 7, 8 and 9. Further, when these numerical keys from 0 to 9 are viewed in column, from a left(-hand) side, these numerical keys are arranged in the order of a column of the numerical keys 1, 4 and 7, a column of the hardware keys 2, 5, 8 and 0, and a column of the numerical keys 3, 6 and 9. That is, the dedicated numerical keys of 1 to 9 are aligned and arranged in a matrix of 3×3 in the case where the numerical key unit 70 is viewed from the front side, so that from an upper stage in a column direction, the numerical keys of 1 to 3, the numerical keys of 4 to 6, and the numerical keys of 7 to 9 are sequentially disposed and so that the numerical key of 0 is disposed on a further lower stage than the row of the numerical keys of 7 to 9. Incidentally, the numerical key of 0 may also be disposed in the column of the numerical keys of 1, 4 and 7 or in the column of the hardware keys of 3, 6 and 9, and the arrangement of the "*" key and the "#" key may appropriately be changed. Further, in this dedicated numerical key unit 70, electronic calculator input is not a principal purpose, and therefore, four arithmetic operators such as +, −, and the like are not provided. Thus, this dedicated numerical key unit 70 is not designed for the purpose of being connected to a PC, and therefore, is different in key arrangement from a general-purpose numerical key unit, described later, connectable to unspecified PCs and so on.

Further, in this embodiment, a layout of the numerical keys 111 to 120 is a telephone type key arrangement such that the numerical values on the rear (back) side B are small and the numerical values on the front side F are large.

However, the layout is not limited to this, and the layout of the numerical keys 111 to 120 may also be a key arrangement of the above-described general-purpose numerical key unit in which the numerical values on the rear side B are large and the numerical values on the front side F are small. Further, the keys 121 and 122 are keys effective in the case where the image forming apparatus 1 is in a FAX mode. For example, in the case where the image forming apparatus 1 is in the FAX mode, the user operates the keys 121 and 122, whereby information of "*" and "#" is transmitted to the controller 30.

The operation key portion 130 includes a start key 131, a stop key 132, a reset key 133, and a clear key 134, and either of these keys are disposed on the front side F of the numerical key portion 110. The operation key portion 130 is comprised of hardware keys for executing, as predetermined processing, processing for inputting information on processing other than numerical value input processing. The start key 131 is comprised of a hardware key capable of inputting information for starting the predetermined processing. The predetermined processing in this embodiment is, for example, copying processing of the image forming apparatus 1, transmission processing of the facsimile, image reading processing of the image reading portion 20, and the like, and a start of execution of these species of processing can be instructed by pushing down the start key 131. That is, the controller 30 controls the image forming portion 22 and starts the image forming operation by operation of the start key 131. Or, the controller 30 controls the modem 37 and starts the facsimile transmission by the operation of the start key 131. Or, the controller 30 controls the image reading portion 20 and starts the reading operation of the image of the original by the operation of the start key 131. The start key 131 is disposed on the front side than the numerical key portion 110 in the state in which the casing 71 is mounted on the image forming apparatus 1.

The stop key 132 is a hardware key capable of inputting information for stopping the predetermined processing started by the start key 131. The stop key 132 is disposed on the front side F than the numerical key portion 110 and is disposed on the right side R than the start key 131 as seen from the front side F in the state in which the casing 71 is mounted on the image forming apparatus 1. The reset key 133 is a hardware key capable of inputting information for resetting the setting inputted to the image forming apparatus 1 and is a key for returning the setting of the image forming apparatus 1 set by the user to an initial state. The reset key 133 is disposed on the front side F than the numerical key portion 110 in the state in which the casing 71 is mounted on the image forming apparatus 1. The clear key 134 is a hardware key capable of inputting information for clearing the numerical value inputted to the image forming apparatus 1 by the numerical key portion 110 and is a key for canceling the numerical value inputted to the image forming apparatus 1 by the numerical keys 111 to 120. The clear key 134 is disposed on the front side F than the numerical key portion 110 in the state in which the casing 71 is mounted on the image forming apparatus 1.

The setting key portion 140 includes, in this embodiment, three keys consisting of a first setting key 141, a second setting key 142, and a third setting key 143, and each of these keys is comprised of a numerical key capable of inputting information for setting a predetermined mode of the image forming apparatus 1. That is, the setting key portion 140 is comprised of a hardware key for executing, as predetermined processing, processing for inputting information on processing other than the numerical value numerical processing. Each of the respective setting keys 141 to 143 is disposed on the back side (rear side) B than the numerical key portion 110 in the state in which the casing 71 is mounted on the image forming apparatus 1. Each of the setting keys 141 to 143 is a key for setting a mode and a function which are determined in advance for the image forming apparatus 1, and is a capable of inputting information on the predetermined processing. Here, the mode and the function which are determined in advance refer to, for example, a voice input mode in which an input operation is performed by voice of the user, and the like mode. The image forming apparatus 1 has various modes and functions corresponding to the setting keys 141 to 143, respectively, and in the case where the user pushes down either of the setting keys 141 to 143, the micon 73 sends, depending on the pushed-down setting key a code determined in advance, to the controller 30, so that the controller 30 sets the various modes and functions of the image forming apparatus 1 which are determined in advance.

On the other hand, an example of the general-purpose numerical key unit 200 which is the input device (second input device) connectable to the image forming apparatus 1 will be described using FIG. 5. The general-purpose numerical key unit 200 includes a connecting cable 201 comprised of a USB cable and a USB connector 202, and is connectable to a general PC, and in addition, to the image forming apparatus 1 of this embodiment. This general-purpose numerical key unit 200 is mounted on the image forming apparatus 1 including the operating portion 50 capable of inputting information, and is capable of inputting information to the image forming apparatus 1 separately from the operating portion 50. As an example of different uses for different purposes in information input between the operating portion 50 and the general-purpose numerical key unit 200, setting of a density, a size, and the like relating to image formation is inputted from the operating portion 50, and numerical values such as the number of sheets subjected to the image formation and a designation number of a facsimile are inputted from the general-purpose numerical key unit 200.

The general-purpose numerical key unit 200 includes, for example, a casing 203, an upper cover 204 provided on an upper surface of the casing 203, and operation keys 205 provided on the upper cover 204. The operation keys 205 roughly include a numerical key portion (second numerical (value) key portion) 206 and a functional key portion (second processing key portion) 207. The numerical key portion 206 is comprised of hardware keys for executing, as the predetermined processing, numerical value input processing for inputting information on numerical values, and includes numerical keys for inputting value values from 0 to 9. The functional key portion 207 is comprised of hardware keys for executing, as the predetermined processing, processing for inputting information on processing other than the numerical value input processing, and includes an arithmetic operation key portion capable of inputting information on four arithmetic operators such as "I", "−", "+", and the like, an input key such as "Enter", a numerical value lock key such as "NumLock", a key capable of deleting the last inputted numerical value, such as "BS", and the like key.

The general-purpose numerical key unit 200 of this embodiment is designed for the purpose of being principally connected to a desktop PC, a note PC, or the like. That is, uses of the general-purpose numerical key unit 200 are principally electronic calculator input and numerical value input, and the general-purpose numerical key unit 200 is not designed for the purpose of inputting a facsimile designation number by being connected to the image forming apparatus 1. For that reason, a key arrangement of the general-purpose numerical key unit 200 is similar to a key arrangement of the electronic calculator. That is, the key arrangement of the general-purpose numerical key unit 200 is similar to a key arrangement defined in an ISO (International Standards Organization). That is, as shown in FIG. 5, in the numerical key portion 206, with respect to the 10 numerical keys, as the hardware keys, from 0 to 9, a row of the numerical keys of 7, 8 and 9 is disposed on the rearmost side, and a row of the numerical keys of 4, 5 and 6 is disposed on the front side F than the row of 7, 8 and 9. Further, a row of the numerical keys of 1, 2 and 3 is disposed on the front side F than the row of the numerical keys 4, 5 and 6. Further, the hardware keys of 0 and 00 are disposed on the further front side F than the row of the hardware keys of 1, 2 and 3. Further, when these numerical keys from 0 to 9 are viewed in column, from a left(-hand) side, these numerical keys are arranged in the order of a column of the numerical keys 1, 4 and 7, a column of the hardware keys 2, 5 and 8, and a column of the numerical keys 3, 6 and 9. The hardware keys of 0 and 00 are disposed so as to bridge over the row of the hardware keys of 1, 4 and 7 and the row of the hardware keys of 2, 5 and 8 or are disposed in the same row of 1, 4 and 7. That is, the numerical keys of 1 to 9 are aligned and arranged in a matrix of 3×3 in the case where the numerical key unit 70 is viewed from the front side, so that from an upper stage in a column direction, the numerical keys of 7 to 9, the numerical keys of 4 to 6, and the numerical keys of 1 to 3 are sequentially disposed and so that the numerical key of 0 is disposed on a further lower stage than the row of the numerical keys of 1 to 3. Further, on the right side R and the back side B of the numerical key portion 206, the functional key portion 207 is disposed, incidentally, in addition to the numerical key of 0, the numerical key of 00 may also be provided. Thus, the general-purpose numerical key unit 200 is not designed for the purpose of inputting the facsimile designation number, and therefore, is different in key arrangement from the dedicated numerical key unit 70.

Here, as shown in FIG. 3, the dedicated numerical key unit 70, the operation key portion 130 and the setting key portion 140 are functional keys other than the numerical values, appropriate key codes are assigned to these functional keys. On the other hand, as shown in FIG. 5, in the general-purpose numerical key unit 200, appropriate key codes are assigned to the functional key portion 207. For this reason, for example, there is a possibility that the key code for the functional keys, such as the start key 131 and the stop key 132, of the dedicated numerical key unit 70 is the same as the key code for the input key peculiar to the general-purpose numerical key unit 200. In this case, when the input key peculiar to the general-purpose numerical key unit 200 connected to the image forming apparatus 1 is pushed down, there is a possibility that the image forming apparatus 1 executes processing which is not assumed by the user, such as a start, a stop, or the like of copying, for example.

Therefore, in this embodiment, in the case where the general-purpose numerical key unit 200 is connected, the image forming apparatus 1 is prevented from malfunctioning on the basis of the input from the general-purpose numerical key unit 200. In the following, an operation thereof will be described.

First, input and output codes of the dedicated numerical key unit 70 will be described using FIG. 6. In FIG. 6, a code conversion table 150 for the dedicated numerical key unit 70 in this embodiment is shown. In this code conversion table 150, for an input code 151 to be inputted, an output code 152 to be outputted and an output attribute 153 are set. For example, when the output attribute 153 is a "character", the output code 152 is constituted by character codes from 0 to 9. Further, when the output attribute 153 is a "job", for the output code 152, a job code 154 for designating a series of operations of the image forming apparatus 1 is listed. In this job code 154, for example, a code of "start" for actuating the image forming apparatus 1 and codes for executing functions of first setting to third setting corresponding to respective setting keys 141 to 143 are included. In the case where the controller 30 receives the input code 151 corresponding to such a job code 154, the controller 30 controls the image reading portion 20 and the image forming portion 22 so as to execute corresponding various pieces of processing via the device input/output circuit 42.

That is, the dedicated numerical key unit 70 is a predetermined input device including, as the hardware key unit 80, the numerical key portion 110 capable of inputting information on at least the numerical values, and the operation key portion 130 and the setting key portion 140 which are capable of inputting information on the predetermined processing. For this reason, the controller 30 executes the predetermined processing by operation of the operation key portion 130 or the setting key portion 140. At this time, the controller 30 executes the predetermined processing depending on a predetermined outputted from the dedicated numerical key unit 70. For example, the controller 30 executes a start operation (predetermined processing) of printing or the like depending on a "start" code (predetermined key code) outputted from the dedicated numerical key unit 70.

On the other hand, input and output codes of the general-purpose numerical key unit 200 will be described using FIG. 7. In FIG. 7, a code conversion table 250 for the general-purpose numerical key unit 200 in this embodiment is shown. In this code conversion table 250, for an input code 251 to be inputted, an output code 252 to be outputted and an output attribute 253 are set. In this embodiment, all the output attributes 253 are "characters", and the output codes 252 are constituted by character codes from "0" to "9" and from "A" to "Z". Accordingly, in the case where the functional key portion 207 of the general-purpose numerical key unit 200 shown in FIG. 5 is pushed down, the key is converted to either of the character codes from "A" to "Z" and is inputted.

Figure 5:
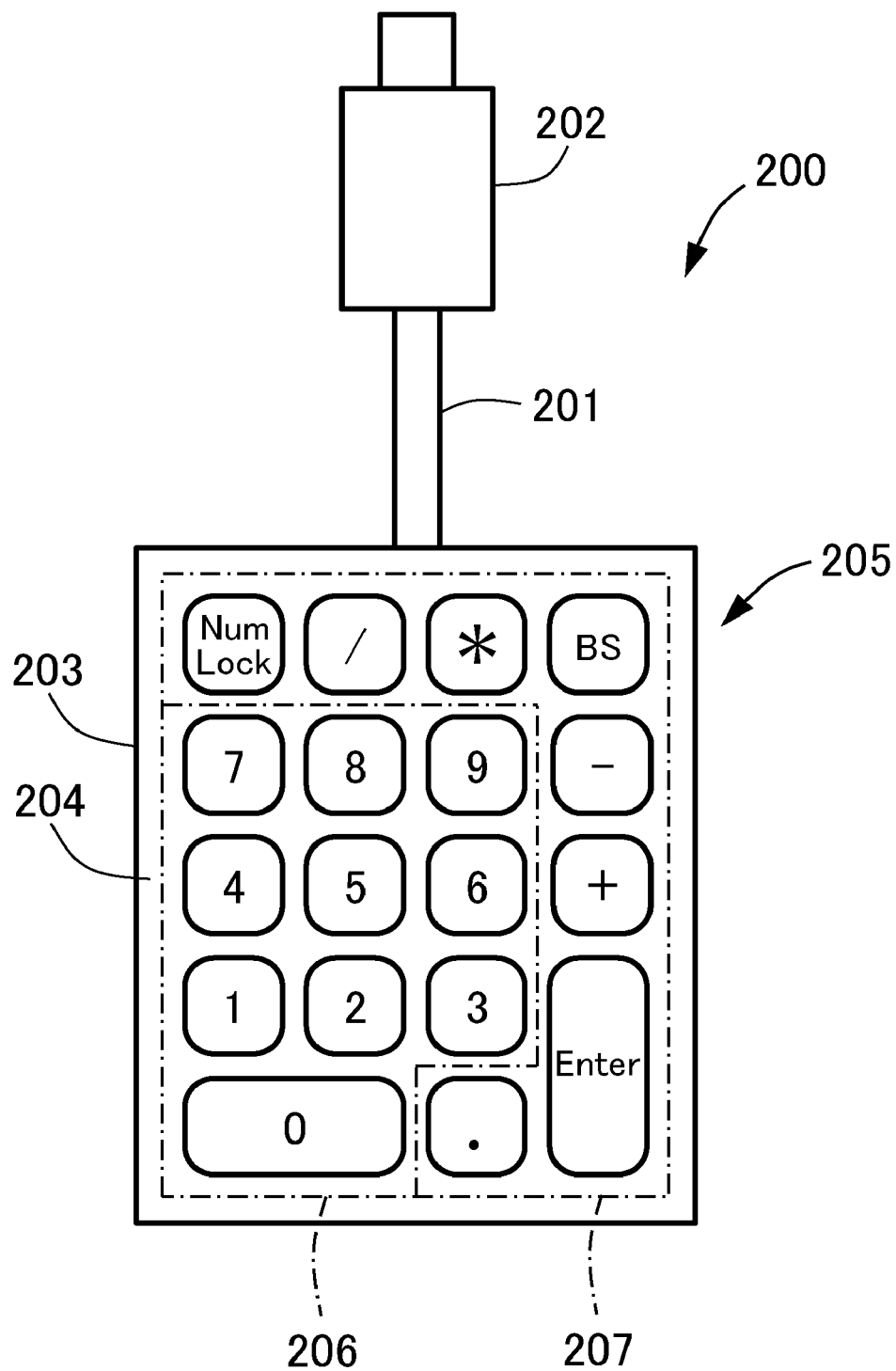
FIG. 5 is a plan view of a general-purpose numerical key unit capable to the image forming apparatus according to this embodiment.

Further, as shown in FIG. 5, in the case where the general-purpose numerical key unit 200 includes, as the hardware keys, the numerical key portion 206 capable of inputting information on at least the numerical values and the functional key portion 207 capable of inputting information on a value other than the numerical values, the following processing is performed. In this case, processing on the numerical value is executed by operation of the numerical key portion 206, whereas there is no setting of a job as the output attribute 253 even when the functional key portion 207 is operated, and therefore, the image forming apparatus 1 is prevented from malfunctioning.

That is, as regards the numerical keys, even when the numerical keys are those of either of the dedicated numerical key unit 70 and the general-purpose numerical key unit 200, the same key code is assigned thereto. For this reason, even if the general-purpose numerical key unit is mounted, when the image forming apparatus 1 is operated on the basis of the key code on the numerical key, the image forming apparatus 1 does not malfunction. However, as regards the keys other than the numerical keys, whether manufactures of the general-purpose numerical key units 200 assign which key code is uncertain. For this reason, when the general-purpose numerical key unit 200 is mounted on the image forming apparatus 1, malfunction is suppressed by preventing the image forming apparatus 1 from performing operation other than display of the numerical values. That is, in the general-purpose numerical key unit 200, input operation from the hardware keys other than the numerical key portion 206 is made invalid. By carrying out such control, in the case where the user mounts the general-purpose numerical key unit 200 on the image forming apparatus 1 and uses the general-purpose numerical key unit 200, it is possible to suppress that the image forming apparatus 1 malfunctions even when the user erroneously pushes the key other than the numerical keys. Incidentally, in this embodiment, assignment of the output code to the hardware keys other than the numerical key portion 206 is the "character" in the general-purpose numerical key unit 200, so that the input operation is capable of being made invalid, but the constitution does not have to be limited to this constitution. For example, in the case where a device connected to the external input/output circuit 40 is discriminated as a device other than the dedicated numerical key unit 70, a constitution in which the output code is not outputted when the input code other than the input code on the numerical key portion is received may also be employed.

Further, in the case where the hardware key of the numerical key unit 70 or 200 connected to the USB port 12 is operated, the controller 30 is capable of executing the predetermined processing corresponding to the operated hardware key. Here, in the case where the dedicated numerical key unit 70 is connected to the USB port 12, when either of the operation keys 100 is operated, the controller 30 executes the predetermined processing corresponding to the operated key. On the other hand, in the case where the general-purpose numerical key unit 200 different from the dedicated numerical key unit 70 is connected to the USB port 12, the controller 30 executes the predetermined processing corresponding to the numerical key portion 206 only when the numerical key portion 206 is operated.

Figure 8:
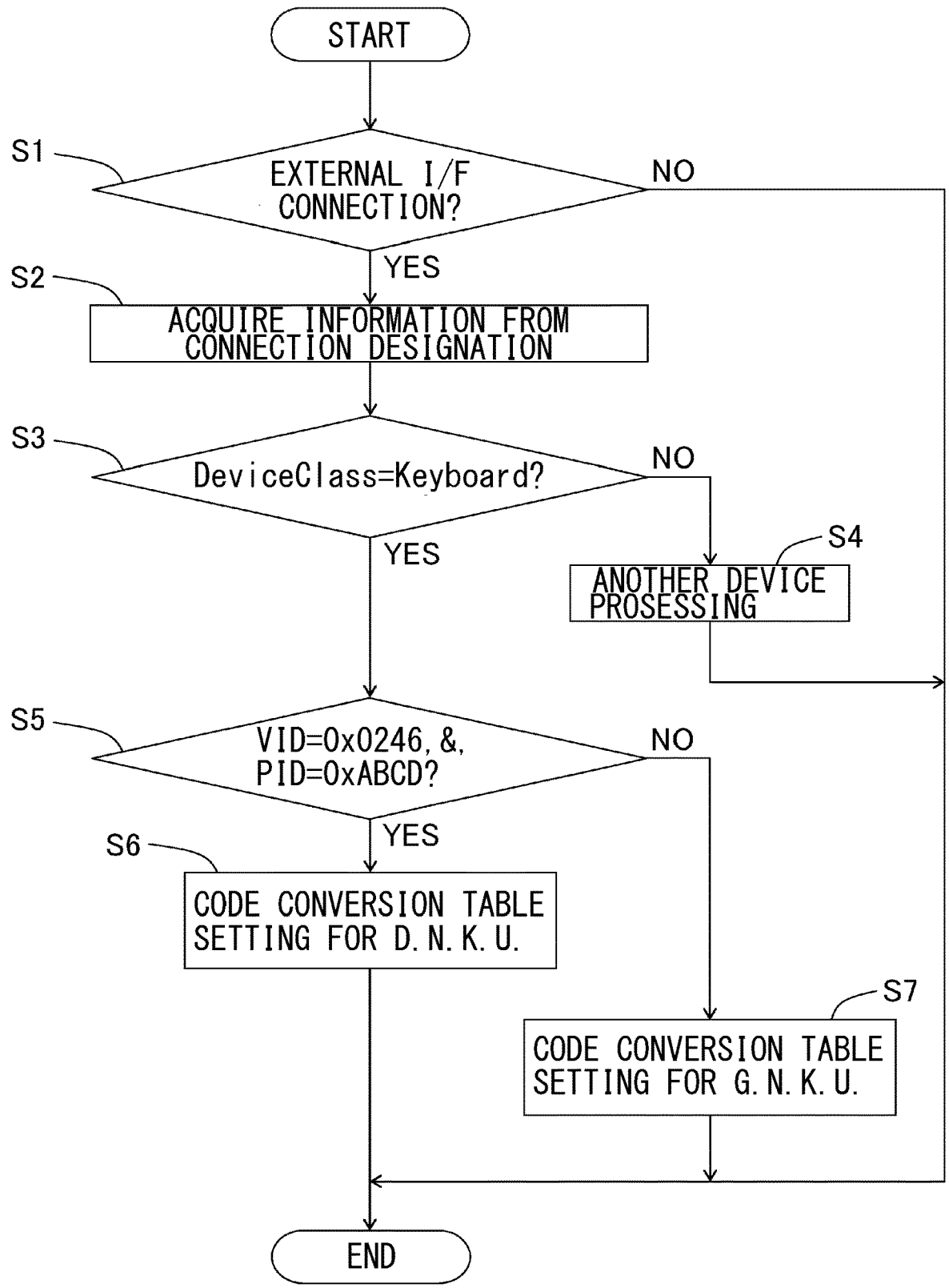
FIG. 8 is a flowchart showing a processing procedure for setting the code conversion table in the case where the numerical key unit is connected to the image forming apparatus according to this embodiment.

Next, a procedure in which whether the device connected to the external input/output circuit 40 is the dedicated numerical key unit 70 or the general-purpose numerical key unit 200 is discriminated and then the code conversion table 150 or 250 corresponding thereto is acquired will be described using a flowchart shown in FIG. 8.

The controller 30 of the image forming apparatus 1 discriminates whether or not the USB device is connected to the external input/output circuit 40 (step S1). In the case where the controller 30 discriminated that same USB device is not connected to the external input/output 40 (step S1; NO), the controller 30 ends connected numerical key discrimination processing. In the case where the controller 30 discriminated that some device is connected to the external input/output 40 (step S1; YES), the controller 30 acquires predetermined information from the connected device via the external input/output circuit 40 (step S2). Here, the predetermined information is, for example, device class information, vendor ID (VID) information, product ID (PID) information, and the like.

The controller 30 discriminates whether or not the acquired device class information is a "Keyboard" (step S3). In the case where the controller 30 discriminated that the acquired device class information is not the "Keyboard" (step S3; NO), the controller 30 discriminates that the device connected to the external input/output circuit 40 is not the keyboard. In this case, the controller 30 performs processing depending on the connected device (step S4). For example, in the case where the connected device is a memory device, the controller 30 carries out control for mounting the memory device, as a memory, in a system thereof, and ends the processing.

In the case where the controller 30 discriminated that the acquired device class information is the "Keyboard" (step S3; YES), the controller 30 discriminates whether the device connected to the external input/output circuit 40 is the dedicated numerical key unit 70 or the general-purpose numerical key unit 200. In this embodiment, the VID of the dedicated numerical key unit 70 acquired in the step S2 is "0x0246", and the PID of the dedicated numerical key unit 70 acquired in the step S2 is "0xABCD". Therefore, the controller 30 discriminates whether or not VID=0x0246 and PID=0xABCD hold (step S5).

In the case where the controller 30 discriminated that VID (acquired in the step S2)=0x0246 and PID (acquired in the step S2)=0xABCD hold (step S5; YES), the controller 30 discriminates that the device connected to the external input/output circuit 40 is the dedicated numerical key unit 70. In this case, the controller 30 transfers, to the RAM 32, the code conversion table 150 (see FIG. 6) which is held in the HDD 34 and which is dedicated to the dedicated numerical key unit 70 and sets the code conversion table 150 in the RAM 32 (step S6), and ends the processing.

On the other hand, in the case where the controller 30 discriminated that VID (acquired in the step S2)=0x0246 and PID (acquired in the step S2)=0xABCD do not hold (step S5; NO), the controller 30 discriminates that the device connected to the external input/output circuit 40 is the general-purpose numerical key unit 200. In this case, the controller 30 transfers, to the RAM 32, the code conversion table 250 (see FIG. 7) held in the HDD 34 and for to the general-purpose numerical key unit 200 and sets the code conversion table 150 in the RAM 32 (step S7), and ends the processing.

Next, an operation of the image forming apparatus 1 depending on the key code sent from the dedicated numerical key unit 70 or the general-purpose numerical key unit 200 connected to the external input/output circuit 40 will be described using a flowchart shown in FIG. 9. First, the case where in the state S5 of the flowchart shown FIG. 8, discrimination that the numerical key unit connected to the external input/output circuit 40 is the dedicated numerical key unit 70 was made will be described.

The controller 30 discriminates whether or not the input code is received from the dedicated numerical key unit 70 connected to the external input/output circuit 40 (step S10). In the case where discrimination that the input code is not received is made (step S10; NO), the controller 30 ends the processing.

In the case where discrimination that the input code is received is made (step S10; YES), the controller 30 makes reference to the code conversion table 150 (step S11), and discriminates an output attribute of the received key code. In this embodiment, the controller 30 discriminates whether or not the output attribute is a job (step S12). In the case where discrimination that the output attribute is the job is made (step S12; YES), the controller 30 executes the inputted job (step S13). For example, when the input code is 0x04, a corresponding output code is "start", and therefore, the controller 30 executes an actuation job for starting copying in the image forming apparatus 1 or for transmitting facsimile.

In the case where discrimination that the output attribute is not the job (step S12; NO), the controller 30 sends the inputted character (step S14). For example, when the input code is 0x1E, the output code for this input code is "1", and therefore, when the image forming apparatus 1 is in a text input mode, "1" which is the output code is employed as a text.

On the other hand, with respect to the flowchart shown in FIG. 9, in the step S5 of the flowchart shown in FIG. 8, the case where discrimination that the numerical key unit connected to the external input/output circuit 40 is the general-purpose numerical key unit 200 is made will be described.

In this case, the controller 30 discriminates whether or not the input code is received from the general-purpose numerical key unit 200 connected to the external input/output circuit 40 (step S10). In the case where discrimination that the input code is received is made (step S10; YES), the controller 30 makes reference to the code conversion table 250 (step S11), and discriminates whether or not the output attribute is the job. In this embodiment, the controller 30 discriminates whether or not the output attribute is the job (step S12), but in the code conversion table 250, all the output attributes 253 of the input code 251 are characters. For this reason, the controller 30 discriminates that the output attribute is not the job is in either case (step S12; NO), and discriminates that the output attribute is the character and sends the inputted character (step S14). For example, when the input code is 0x04, the output code for this input code is "A", and therefore, when the image forming apparatus 1 is in the text input mode, "A" which is the output code is employed as a text.

Thus, in the case where the dedicated numerical key unit 70 is mounted on the image forming apparatus 1, when the key code (for example, 0x04) is outputted by the operation of the connected dedicated numerical key unit 70, the controller 30 executes "start" processing. On the other hand, in the case where the general-purpose numerical key unit 200 of a kind different from the dedicated numerical key unit 70 is mounted on the image forming apparatus 1, even when the key code other than the numerical key (code) is outputted by the operation of the connected general-purpose numerical key unit 200, the controller 30 is prevented from malfunctioning. For example, in the case where 0x04 is outputted as the key code, "A" which is the output code is outputted as the text, so that the controller 30 is prevented from malfunctioning such that the "start" processing is executed.

Further, the controller 30 is capable of executing a discriminating mode in which the numerical key unit 70 or 200 connected to the USB port 12 is either of the dedicated numerical key unit 70 and the general-purpose numerical key unit 200 is automatically discriminated. The controller 30 executes the discrimination mode in the case where the power source is in an ON state and a connecting cable 75 or 201 of the numerical key unit 70 or 200 is connected to the USB port 12. Further, the controller 30 also similarly executes the discrimination mode in the case where the connecting cable 75 or 201 of the numerical key unit 70 or 200 is connected to the USB port 12 and the power source is switched from an OFF state to the ON state. That is, the controller 300 automatically discriminates whether or not the connected numerical key unit 70 or 200 is the dedicated numerical key unit 70. Accordingly, there is no need that the user makes setting him(her)self, and therefore, convenience can be improved.

As described above, according to the image forming apparatus 1 of this embodiment, in the case where the general-purpose numerical key unit 200 of the kind different from the dedicated numerical key unit 70 is mounted on the image forming apparatus 1, the controller 30 goes into action in the following manner. First, the controller 30 is prevented from malfunctioning such that a start of printing or the like is executed even when the functional key portion 207 other than the numerical key portion 206 of the general-purpose numerical key unit 200 is operated. By this, even if the key code of the predetermined processing, other than the numerical value input, such as the start of printing is outputted when the general-purpose numerical key unit 200 is connected, the controller 30 is prevented from malfunctioning.

Incidentally, in the above-described embodiment, in the case where the connecting cable 75 or 201 of the numerical key unit 70 or 200 is connected to the USB port 12, the controller 30 automatically detects whether or not the connected numerical key unit 70 or 200 is the dedicated numerical key unit 70. However, the present invention is not limited to this, and in the case where the connecting cable 75 or 201 of the numerical key unit 70 or 200 is connected to the USB port 12, the user may also input, to the operating portion 50, whether or not the connected numerical key unit is the dedicated numerical key unit 70.

Further, in the above-described embodiment, as the general-purpose numerical key unit 200, one shown in FIG. 5 is illustrated as an example, but the present invention is not limited to this, and a general-purpose numerical key unit in another form may also be applied. Or, the present invention is not limited to the numerical key unit principally including the numerical keys, and may also be similarly applied to a full keyboard capable of also inputting the characters.

Second Embodiment

<Key Assignment Setting Screen>

Next, in a signal mode described later, such as the case where the general-purpose numerical key unit 200 is connected to the image forming apparatus 1, key assignment setting screens 250 and 251 displayed on the operating portion 50 will be described using parts (a) and (b) of FIG. 10. As shown in part (a) of FIG. 10, the key assignment setting screen 250 is a screen for causing the user to select key assignment when the general-purpose numerical key unit 200 is connected to the image forming apparatus 1. Screen data of the key assignment setting screen 250 are stored in the HDD 34 (see FIG. 2) similarly as other display screen data. The CPU 31 calls the key assignment setting screen from the HDD 32 at a predetermined timing in the case of the constitution in which the general-purpose numerical key unit 200 is connected. Further, the key assignment setting screen 250 is displayed on the liquid crystal module 54 of the operating portion 50 via the operating portion input/output circuit 35.

A key kind display portion 252 of the key assignment setting screen 250 carries out display of a key kind mounted on the general-purpose numerical key unit 200 shown in FIG. 5. In this embodiment, "/", "*", "−", "+", "Enter", "." and "BS" which are generally provided on the general-purpose numerical key unit 200 are displayed. The function display portion 253 displays functions currently assigned to respective keys displayed on the key kind display portion 252. When the user touches a frame (box) of the function display portion 253, the micon 51 detects the touched frame via the touch panel module 52, and carries out screen display enabling assignment of a function to the key kind displayed in the frame at the key kind display portion 252.

Figure 10:
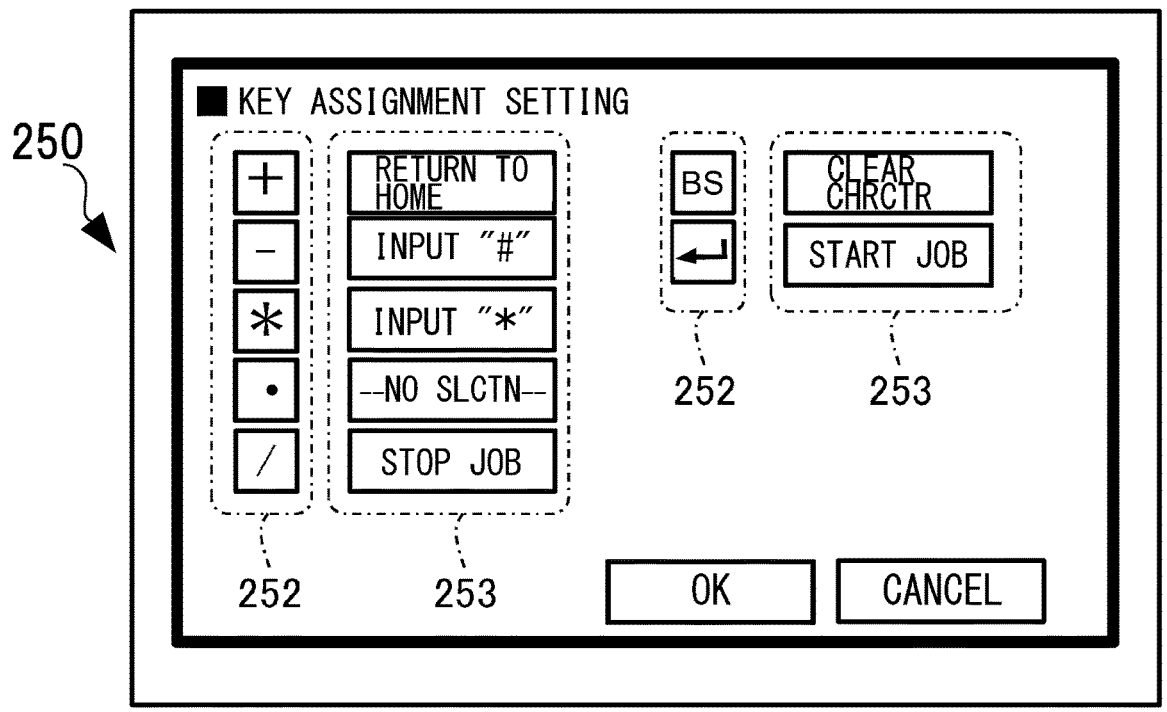
FIG. 10 includes illustrations showing key assignment setting screens of an image forming apparatus according to a second embodiment, in which part (a) is the illustration before an operation by a user, and part (b) is the illustration during the operation by the user.
Figure 10:
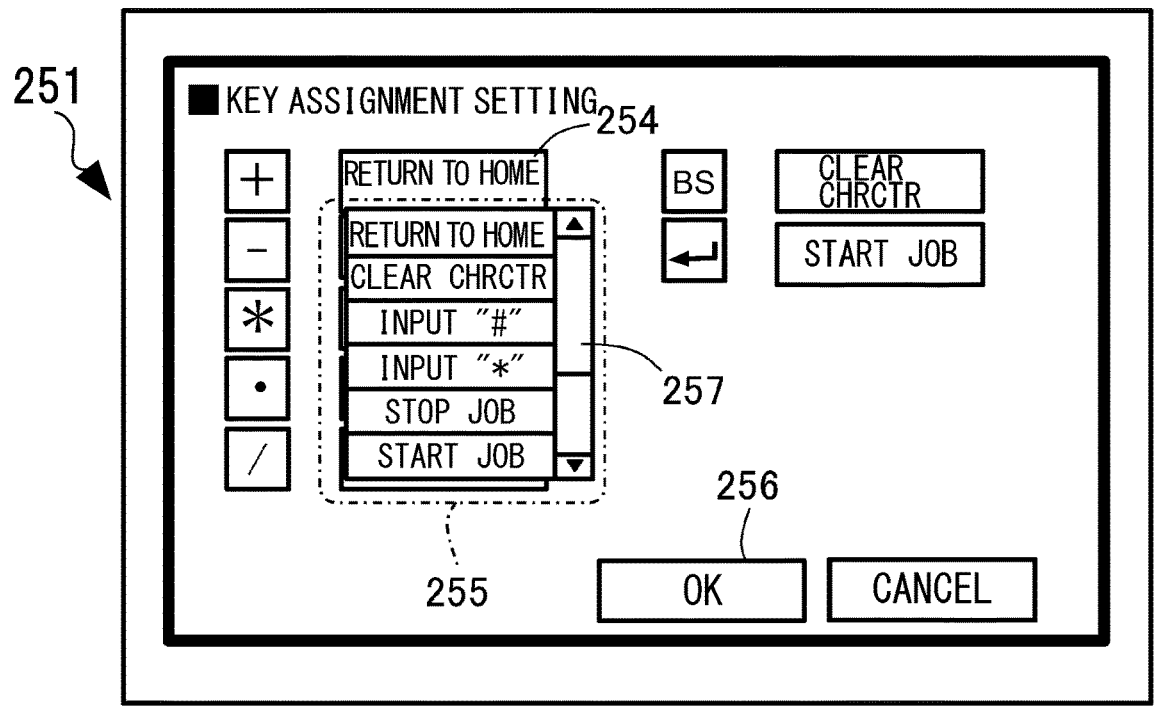

The screen for assigning the function to the key kind displayed at such a key kind display portion 252 is shown on the key assignment setting screen 251 of part (b) of FIG. 10. In this embodiment, as an example, the key assignment setting screen 251 shows the case where the user touches and selects a frame 254 of the function display portion 253 corresponding to the "+" key of the key kind display portion 252. In this case, a function selection screen (option) 255 is displayed, so that the user is capable of selecting a function assigned to the "+" key. A currently selected function is "return to home screen", and therefore, a frame of "return to home screen" of the function selection screen 255 is displayed in a black/while inversion manner. In the case where an arbitrary frame of the function selection screen 255 is touched and selected, the function given in the frame is displayed in the frame 254.

For example, when the user touches and selects "clear character" (frame), the "clear character" frame on the function selection screen 255 is newly displayed in the black/white inversion manner, and the black/while inversion display of the frame of "return to home screen" is returned to an original (display). In addition, wording of "clear character" is displayed in the frame 254. Thus, by touching an OK button 256 after the functions corresponding to the key kind display portion is completely selected in a general way, an operation in which not only the function of "clear character" is assigned to the "+" key but also a selected function is assigned to an associated key is completed. Further, by sliding a scroll bar 256 up and down, a function which is not displayed can be displayed on the function selection screen 255. In this embodiment, as the functions displayed on the function selection screen 255, for example, start processing (job start) for starting the image forming operation by the image forming portion 22 and stop processing (job step) are included as predetermined processing.

Next, a key assignment table 260 for the general-purpose numerical key unit 200 will be described using FIG. 11. As shown in FIG. 11, the key assignment table 260 is a table for grasping functions assigned to the respective keys of the general-purpose numerical key unit 200 is prepared for each of the vendor ID (VID) and the product ID (PID) which are peculiarly assigned to every general-purpose numerical key unit 200. The CPU 31 discriminates from the VID/PID that a new general-purpose numerical key unit 200 is connected, and newly prepares a key assignment table 260 associated with the VID/PID and stores the key assignment table 260 in the HDD 34. That is, the HDD 34 stores the functional key portion 207 and the functions set for the functional key portion 207 in association with each other. Further, when non-connection of the general-purpose numerical key unit 200 is detected, a corresponding key assignment table 260 is deleted from the HDD 34.

<Key Assignment Table>

FIG. 11 shows the key assignment table 260 about the general-purpose numerical key unit 200 possessing information in which the VID is "0x0123" and the PID is "0x0ABC". Further, this key assignment table 260 is a table in which key setting displayed on the key assignment setting screen 250 of parts (a) and (b) of FIG. 10 is reflected. In a column of "key code" which is a first column, key codes for key kinds listed in parentheses are listed. The key codes listed in this embodiment are prepared in advance by the image forming apparatus 1. In a column of "default (value)" which is a second column, functions assigned, as initial values, to the key codes listed in the column of "key code" which is the first column are listed. Here, the keys for which "NULL" is listed correspond to "no selection (NO SLCTN)" of the key assignment setting screen 250 shown in parts (a) and (b) of FIG. 10. In a column of "setting value" which is a third column, functions currently assigned to the key kinds listed in the column of "key code" which is the first column are listed. When the key assignment table 260 is newly prepared, in the column of "setting value", values of the second column of "default" are listed. This is renewed to a function after assignment processing in the case where the key setting processing described in parts (a) and (b) of FIG. 10.

Here, in this embodiment, the controller 30 is capable of executing the discrimination mode described later in which the controller 30 automatically discriminates whether or not the numerical key unit connected to the USB port 12 is a setting object in the setting mode described later. In the case where in the discrimination mode, the controller 30 discriminated that the connected numerical key unit is the setting object, the controller 30 executes the setting mode, and in the case where the controller 30 discriminated that the numerical key unit is not the setting object, the controller 30 does not execute the setting mode. In this embodiment, in the case where in the discrimination mode, the connected numerical key unit is, for example, the dedicated numerical key unit 70 including the start key 131, the controller 30 discriminates that the dedicated numerical key unit 70 is not the setting object.

Further, in this embodiment, the setting mode is a mode in which predetermined processing is capable of being set for the functional key portion 207. In the setting mode, the controller 30 displays the function selection screen 255 including options of a plurality of functions by displaying the key assignment setting screens 250 and 251 on the operating portion 50, and sets a selected function for the functional key portion 207. That is, the controller 30 displays the key assignment setting screens 250 and 251 including the options on the operating portion 50. Further, in the case where the function is not set by the setting mode, information inputted to the controller 30 by the functional key portion 207 such as the "NumLock" or "Enter" key does not function in the controller 30.

Figure 12:
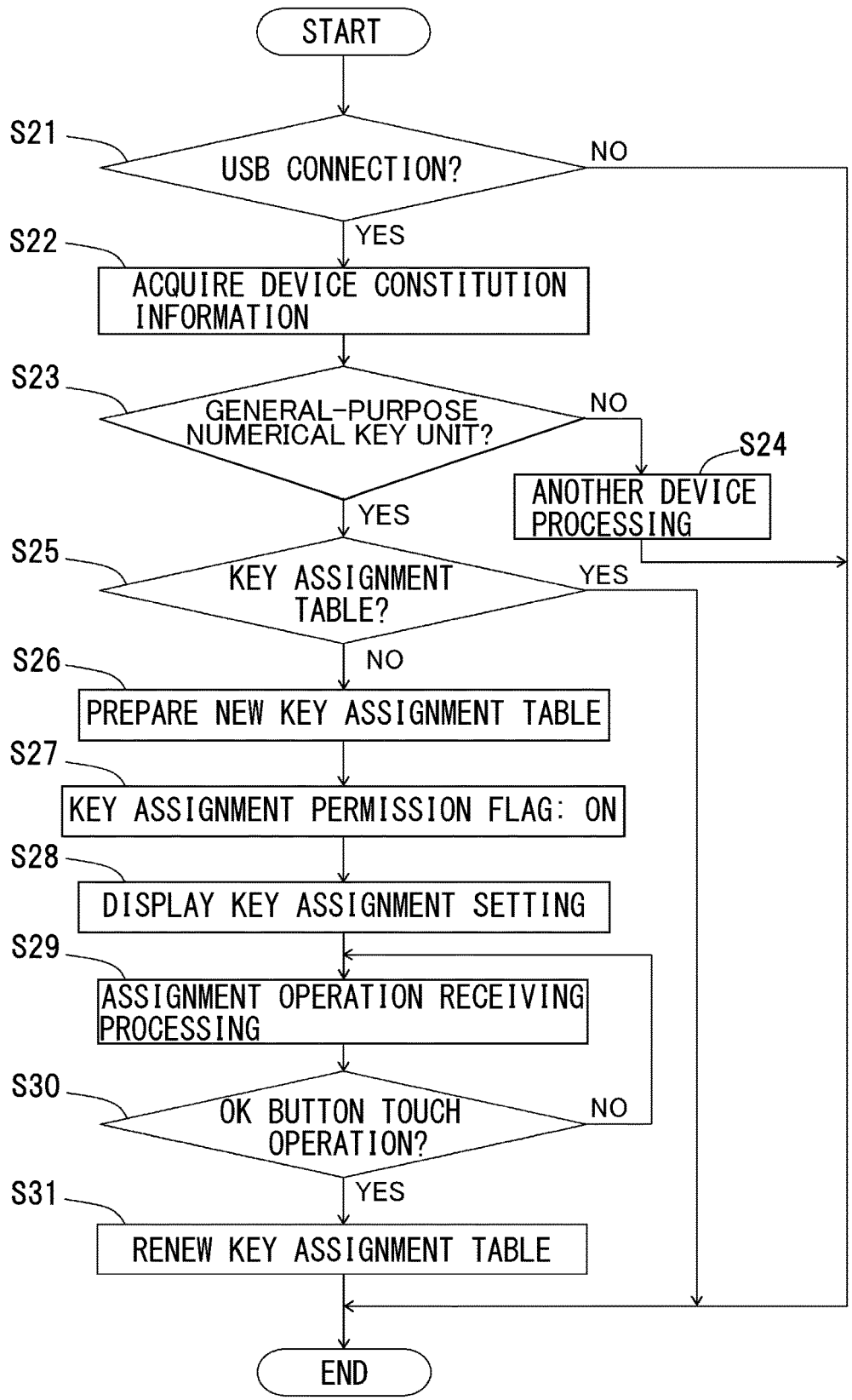
FIG. 12 is a flowchart showing a processing procedure in the case where the general-purpose numerical key unit is connected to the image forming apparatus according to the second embodiment.

Next, a procedure of key setting processing in the case where the general-purpose numerical key unit 200 is connected to the image forming apparatus 1 will be described along a flowchart shown in FIG. 12. In this embodiment, a main power source of the image forming apparatus 1 is in an ON state, the controller 30 has a constitution in which when the connection of the general-purpose numerical key unit 200 is detected, the controller 30 immediately causes the operating portion 50 to display the key assignment setting screen 250 and prompts the user to make setting.

The controller 30 of the image forming apparatus 1 discriminates whether or not same device is USB-connected to the external input output circuit 40 via the USB port 12 (step S21). In the case where the controller 30 discriminated that some device is not USB-connected to the external input/output circuit 40 via the USB port 12 (NO of step S21), the controller 30 ends the processing. In the case where the controller 30 discriminated that some device is USB-connected to the external input/output circuit 40 via the USB port 12 (YES of step S21), the controller 30 acquires information of a device constitution from the connected device via the external input/output circuit 40 (step S22). Here, the information of the device constitution is, for example, the device class information, the VID information, the PID information, and the like. That is, in this embodiment, in the case where the power source is in the ON state and the general-purpose numerical key unit 200 is connected to the USB port 12, the controller 30 executes the setting mode as described later. Or, in the case where the general-purpose numerical key unit 200 is connected to the USB port 12 when the power source is in the OFF state and where the power source is switched from the OFF state to the ON state, the controller 30 executes the setting mode as described later. Incidentally, the setting mode in which predetermined processing is capable of being set for the key portion may be set from the operating portion 50 of the image forming apparatus 1 or may also be set from an external PC or the like connected to the image forming apparatus 1.

The controller 30 discriminates whether or not the USB-connected device is the general-purpose numerical key unit 200 (step S23, discrimination mode). In the case where the controller 30 discriminated that the USB-connected device is not the general-purpose numerical key unit 200 (NO of step S23), the controller 30 carries out processing depending on the connected device (step S24). For example, in the case where the connected device is a memory device, the controller 30 carries out control of mounting the memory device as a memory in a system of the controller 30, and ends the processing. Further, in the case where the connected device is the dedicated numerical key unit 70, the controller 30 performs the processing so that the dedicated numerical key unit 70 can be used immediately, without executing the setting mode.

In the case where the controller 30 discriminated that the USB-connected device is the general-purpose numerical key unit 200 (YES of step S23), the controller 30 discriminates whether or not the key assignment table 260 is stored in the HDD 34 (step S25). The controller 30 discriminates whether or not the key assignment table 260 is stored in the HDD 34, on the basis of the VID/PID included in the device constitution information. In the case where the controller 30 discriminated that the key assignment table 260 is stored in the HDD 34 (YES of S25), the controller 30 ends the processing and utilizes the stored key assignment table 260.

In the case where the controller 30 discriminated that the key assignment table 260 is not stored in the HDD 34 (NO of step S25), the controller 30 newly prepares a key assignment table 260 associated with the VID/PID of the general-purpose numerical key unit 200 (step S26). The controller 30 turns on a key assignment permission flag so that the general-purpose numerical key unit 200 is connected and discrimination that key setting is possible can be made (step S27). This key assignment permission fag is provided in the HDD 34 and is stored in the form in association with the above-described VID/PID.

The controller 30 displays, on the liquid crystal module 54 of the operating portion 50, the key assignment setting screen 250 (see part (a) of FIG. 7) in the setting mode (step S28). In this embodiment, the controller 30 displays the key assignment setting screen 250 on the liquid crystal module 54, so that the setting mode is started. That is, in the case where the general-purpose numerical key unit 200 is connected to the USB port 12, the controller 30 is capable of executing the setting mode in which predetermined processing is capable of being set for the functional key portion 207. The controller 30 executes processing for receiving a function assignment operation by the user on the key assignment setting screens 250 and 251 (see parts (a) and (b) of FIG. 7) (step S29), and discriminates whether or not the OK button 256 of the key assignment setting screen 251 is touch-operated (step S30).

In the case where the controller 30 discriminated that the OK button 256 of the key assignment setting screen 251 is not touch-operated (NO of step S30), the controller 30 continues key setting processing (step S29). In the case where the OK button 256 of the key assignment setting screen 251 is touch-operated (YES of step S30), the controller 30 renews the key assignment table 260 (see FIG. 11) (step S31), and ends the processing. Incidentally, after the key assignment table 260 is renewed, even when the USB connection of the general-purpose numerical key unit 200 is released, the renewed key assignment table 260 remains while being stored in the HDD 34. By this, in the case where the same general-purpose numerical key unit 200 is connected next time, the controller 30 discriminates in the step S25 that the key assignment table 260 is stored in the HDD 34 (YES of step S25), and utilizes the stored key assignment table 260.

As described above, according to the image forming apparatus 1 of this embodiment, in the case where the general-purpose numerical key unit 200 is connected to the USB port 12, the controller 30 is capable of executing the setting mode in which the predetermined processing is capable of being set for the functional key portion 207. For this reason, in the case where the general-purpose numerical key unit 200 is connected to the image forming apparatus 1, even the functional key portion 207 other than the numerical key portion 206 is capable of being effectively utilized and an unintended operation can be prevented. By this, an operating property and usability of the general-purpose numerical key unit 200 connected to the image forming apparatus 1 can be improved.

Further, according to the image forming apparatus 1 of this embodiment, the controller 30 executes the setting mode in the case where the power source is in the ON state and where the general-purpose numerical key unit 200 is connected to the USB port 12. Or, in the case where the general-purpose numerical key unit 200 is connected to the USB port 12 when the power source is in the OFF state and where the power source is switched in state from the OFF state to the ON state. For this reason, the user is capable of automatically executing the setting mode only by connecting the general-purpose numerical key unit 200 to the image forming apparatus 1 when the power source is in the ON state. Similarly, the user is capable of automatically executing the setting mode only by putting the power source in the ON state when the general-purpose numerical key unit 200 is connected to the image forming apparatus 1. Accordingly, the user is capable of executing the setting mode with minimum labor, so that a good operating property can be obtained.

Further, according to the image forming apparatus 1 of this embodiment, the controller 30 does not execute the setting mode in the case where the connect numerical key unit is the dedicated numerical key unit 70. For this reason, a time until the dedicated numerical key unit 70 becomes a usable state after being connected can be shortened, and moreover, the operation key portion 130 and the setting key portion 140 of the dedicated numerical key unit 70 can be utilized as they are.

Third Embodiment

Figure 13:
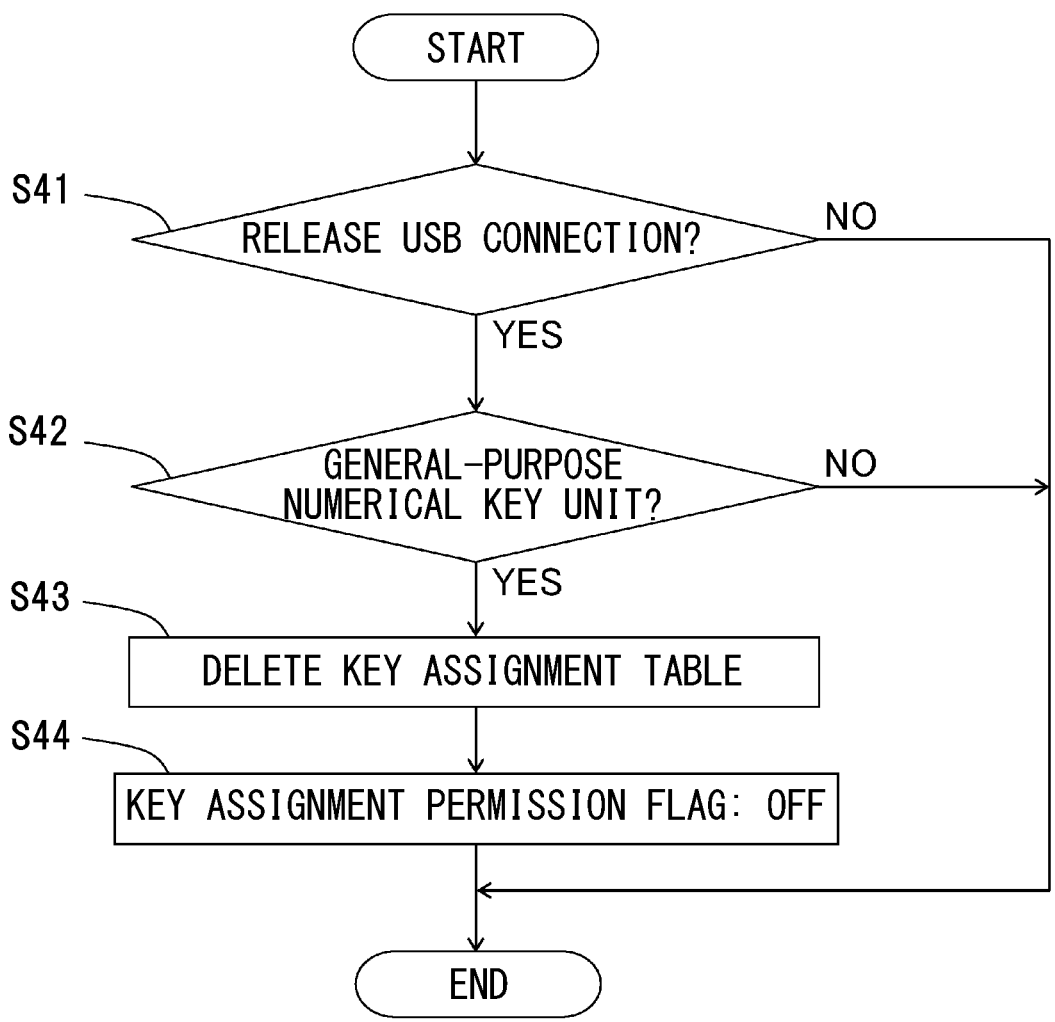
FIG. 13 is a flowchart showing a processing condition procedure in the case where the general-purpose numerical key unit is connected to an image forming apparatus according to a third embodiment.

Next, a third embodiment of the present invention will be specifically described along a flowchart shown in FIG. 13. In this embodiment, a constitution is different from the constitution of the second embodiment in that when the USB connection of the general-purpose numerical key unit 200 is released, the key assignment table 260 is deleted. However, other constitutions are similar to those of the second embodiment, and therefore, reference numerals or symbols are made the same and detailed description will be omitted.

A processing procedure in the case where the general-purpose numerical key unit 200 connected to the image forming apparatus 1 in this embodiment is disconnected will be described along a flowchart shown in FIG. 13. In this embodiment, it is assumed that the main power source of the image forming apparatus 1 is in the ON state and that some device is USB-connected to the USB port 12 until just before.

The controller 30 of the image forming apparatus 1 discriminates whether or not USB connection of some device is released from the USB port 12 (step S41). In the case where the controller 30 discriminated that the USB-connection is not released (NO of step S41), the controller 30 ends the processing.

In the case where the controller 30 discriminated that the USB connection of some device is released from the USB port 12 (YES of step S41), the controller 30 discriminates whether or not the device of which USB connection is released is the general-purpose numerical key unit 200 (step S42). In the case where the controller 30 discriminated that the released device is not the general-purpose numerical key unit 200 (NO of step S42), the controller 30 ends the processing.

In the case where the controller 30 discriminated that the device of which USB connection is released is the general-purpose numerical key unit 200 (YES of step S42), the controller 30 makes reference to VID/PID associated with the released general-purpose numerical key unit 200. Then, on the basis of the VID/PID referred to, the controller 30 deletes the key assignment table 260 of the general-purpose numerical key unit 200 stored in the HDD 34 (S43). Further, the controller 30 turns off the key assignment permission flag stored in the HDD 34 (step S44), and ends the processing. By this, in the case where the same general-purpose numerical key unit 200 is connected next time, the controller 30 discriminates in the step S25 of FIG. 13 that the key assignment table 260 is not stored in the HDD 34 (NO of step S25), and newly prepares a key assignment table 260.

As described above, according to the image forming apparatus 1 of this embodiment, when the USB connection of the general-purpose numerical key unit 200 is released, the key assignment table 260 is deleted. For this reason, for example, it is possible to prevent that many users possess general-purpose numerical key units different from each other and use capacity of the HDD 34 more than necessary by storing all the key assignment tables 260 in the HDD 34.

Fourth Embodiment

Figure 14:
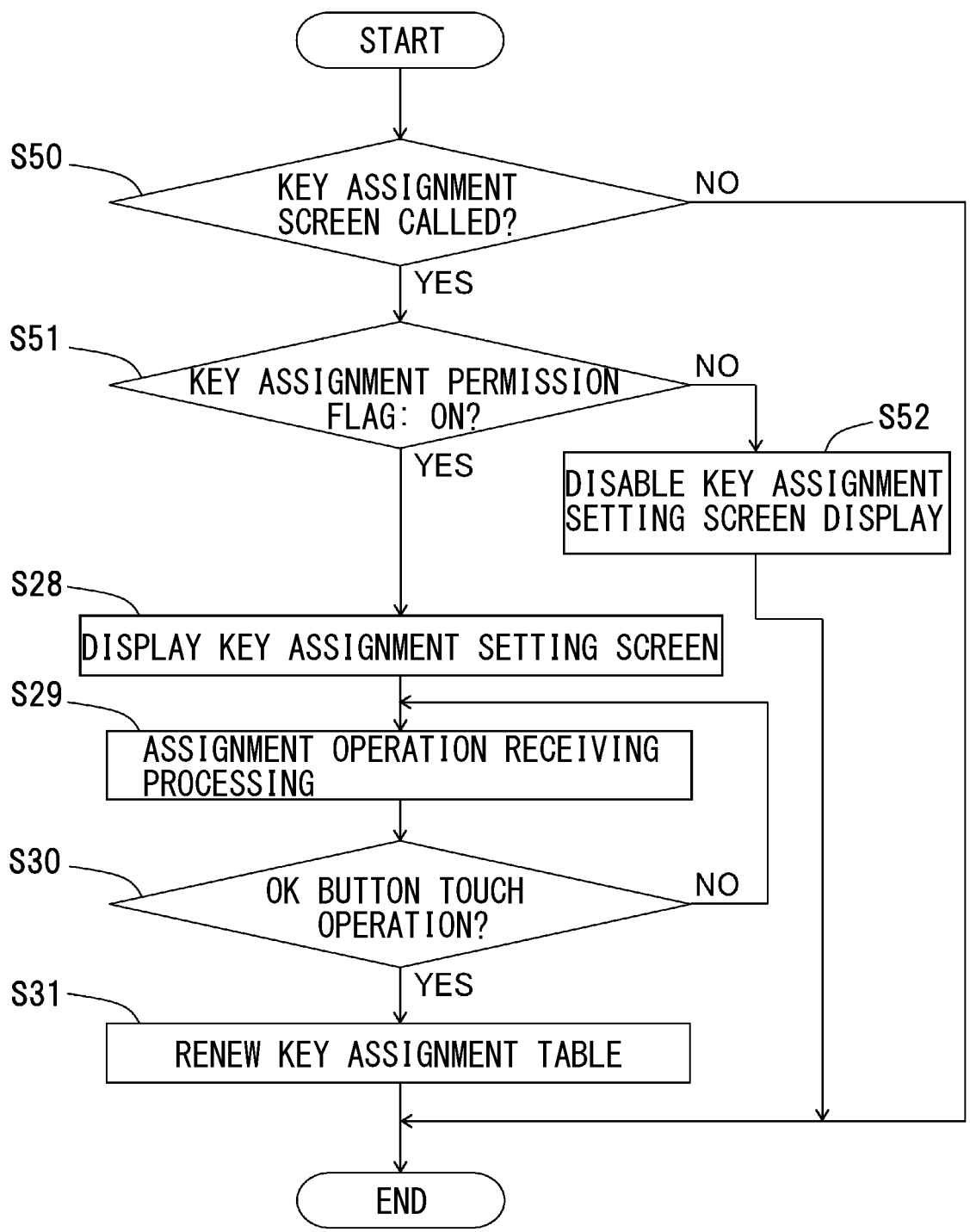
FIG. 14 is a flowchart showing a processing procedure in the case where the general-purpose numerical key unit is connected to an image forming apparatus according to a fourth embodiment.

Next, a fourth embodiment of the present invention will be specifically described along a flowchart shown in FIG. 14. In this embodiment, a constitution is different from the constitution of the second embodiment in that the controller 30 is capable of executing the setting mode by the operation of the operating portion 50. However, other constitutions are similar to those of the second embodiment, and therefore, reference numerals or symbols are made the same and detailed description will be omitted.

Figure 9:
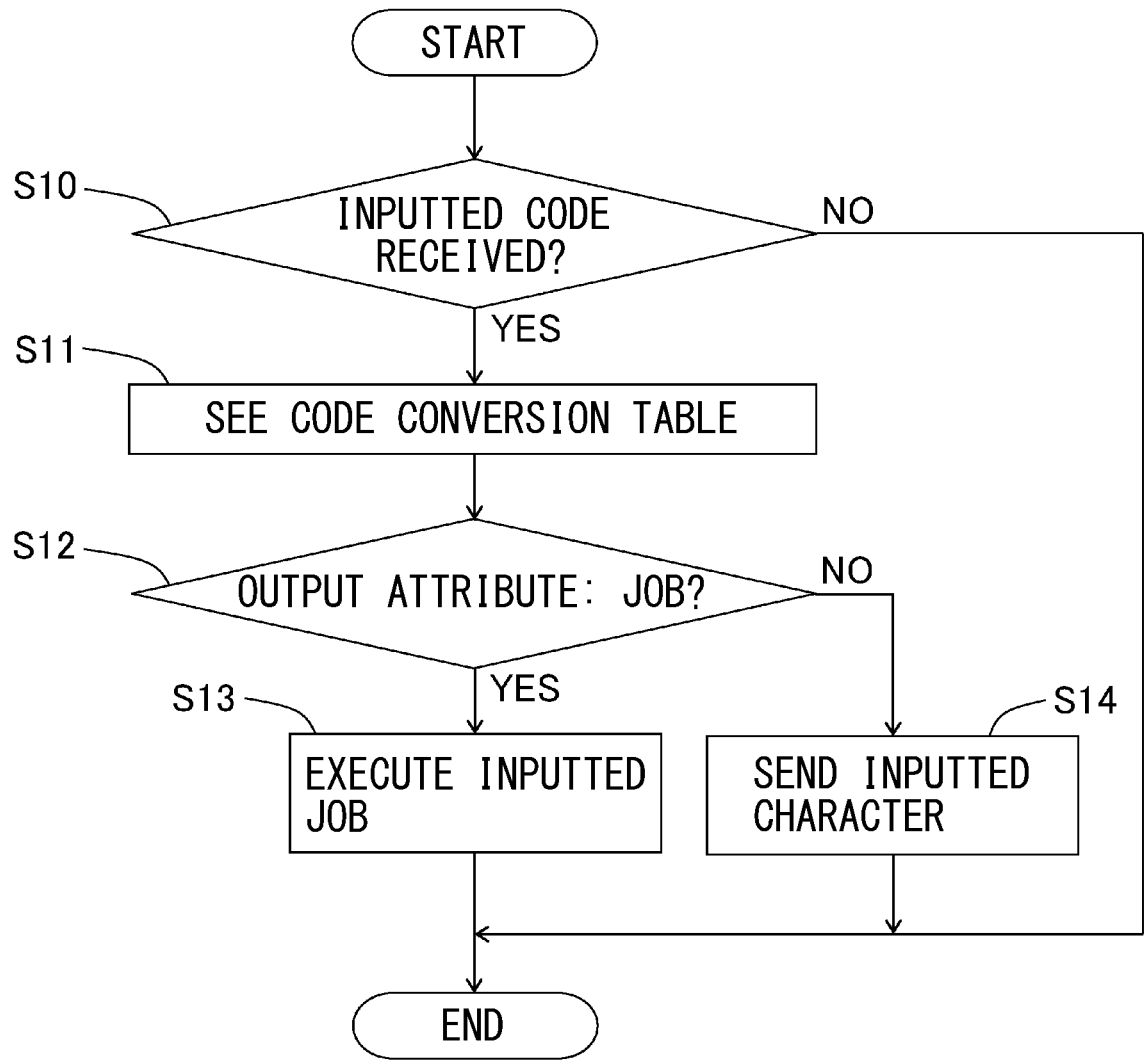
FIG. 9 is a flowchart showing a processing procedure after the numerical key unit is connected to the image forming apparatus according to this embodiment and the code conversion table is set.

A processing procedure in the case where the general-purpose numerical key unit 200 connected to the image forming apparatus 1 in this embodiment will be omitted from description because the procedure is similar to S21 to S27 of FIG. 9. Next, a processing procedure in the case where the setting mode is executed by a user's operation in this embodiment will be described along a flowchart shown in FIG. 14. The controller 30 discriminates whether or not a calling operation in which the user operates the operating portion 50 and causes the liquid crystal module 54 to display the key assignment setting screen 250 (see part (a) of FIG. 10) is performed (step S50). In the case where the controller 30 discriminated that the calling operation for displaying the key assignment setting screen 250 on the liquid crystal module 54 is not performed (NO of step S50), the controller 30 ends the processing.

In the case where the controller 30 discriminated that the calling operation for displaying the key assignment setting screen 250 on the liquid crystal module 54 is performed (YES of S50), the controller 30 discriminates whether or not the key assignment permission flag of the general-purpose numerical key unit 200 during connection is turned on (step S51). In the case where the controller 30 discriminated that the key assignment permission flag is not turned on (NO of S51), the controller 30 does not cause the liquid crystal module 54 to display the key assignment setting screen 250 (step S52). In the step S52, as an example, in the case where the user touches a button for selecting a display of the key assignment setting screen 250 without causing the liquid crystal module 54 to display the key assignment setting screen 250, wording to the effect that "a numerical key (unit) capable of key setting is not connected" is displayed. Or, the controller 30 checks the key assignment permission flag in the step S51 immediately before the user reaches a screen capable of selecting the display of the key assignment setting screen 250, and an option of the key assignment setting screen 250 is grayed out and thus the user may also be disabled to select the option.

In the case where the controller 30 discriminated that the key assignment permission flag of the general-purpose numerical key unit 200 is turned on (YES of step S51), the controller 30 executes the processing of the setting mode similarly as in the steps S28 to S31. That is, the controller 30 displays, on the liquid crystal module 54 of the operating portion 50, the key assignment setting screen 250 in the setting mode (step S28). The controller 30 executes processing for receiving a function assignment operation by the user on the key assignment setting screens 250 and 251 (see parts (a) and (b) of FIG. 10) (step S29), and discriminates whether or not the OK button 256 of the key assignment setting screen 251 is touch-operated (step S30). In the case where the OK button 256 of the key assignment setting screen 251 is touch-operated (YES of step S30), the controller 30 renews the key assignment table 260 (see FIG. 11) (step S31), and ends the processing.

As described above, according to the image forming apparatus 1 of this embodiment, the controller 30 is capable of executing the setting mode by the operation of the operating portion 50. For this reason, for example, in the case where the user wants to change the key setting during use of the general-purpose numerical key unit 200, the key setting can be easily changed, so that the operating property and the usability of the general-purpose numerical key unit 200 can be improved.

Fifth Embodiment

Figure 15:
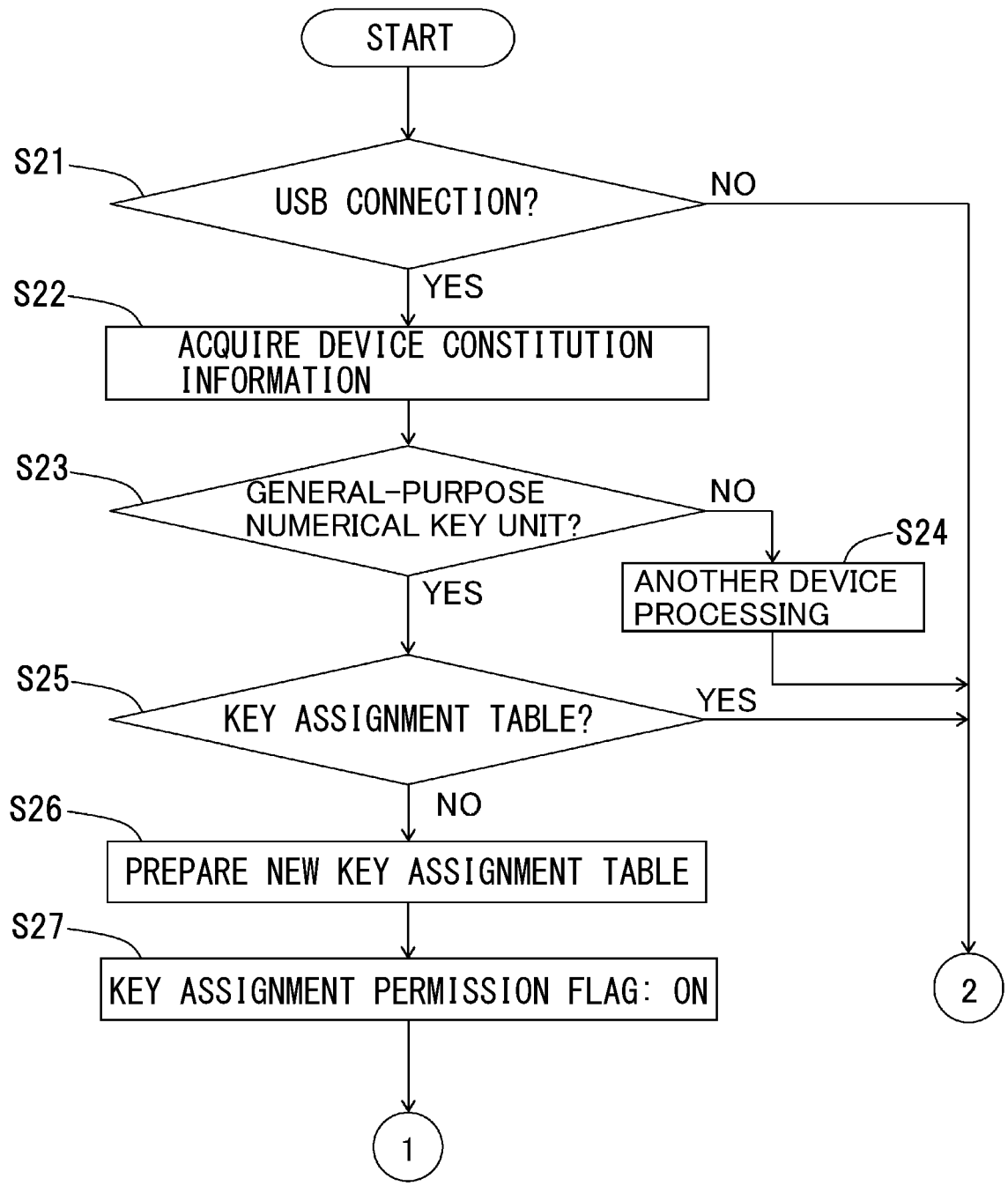
FIG. 15 is a flowchart showing the first half of a processing procedure in the case where the general-purpose numerical key unit is connected to an image forming apparatus according to a fifth embodiment.
Figure 16:
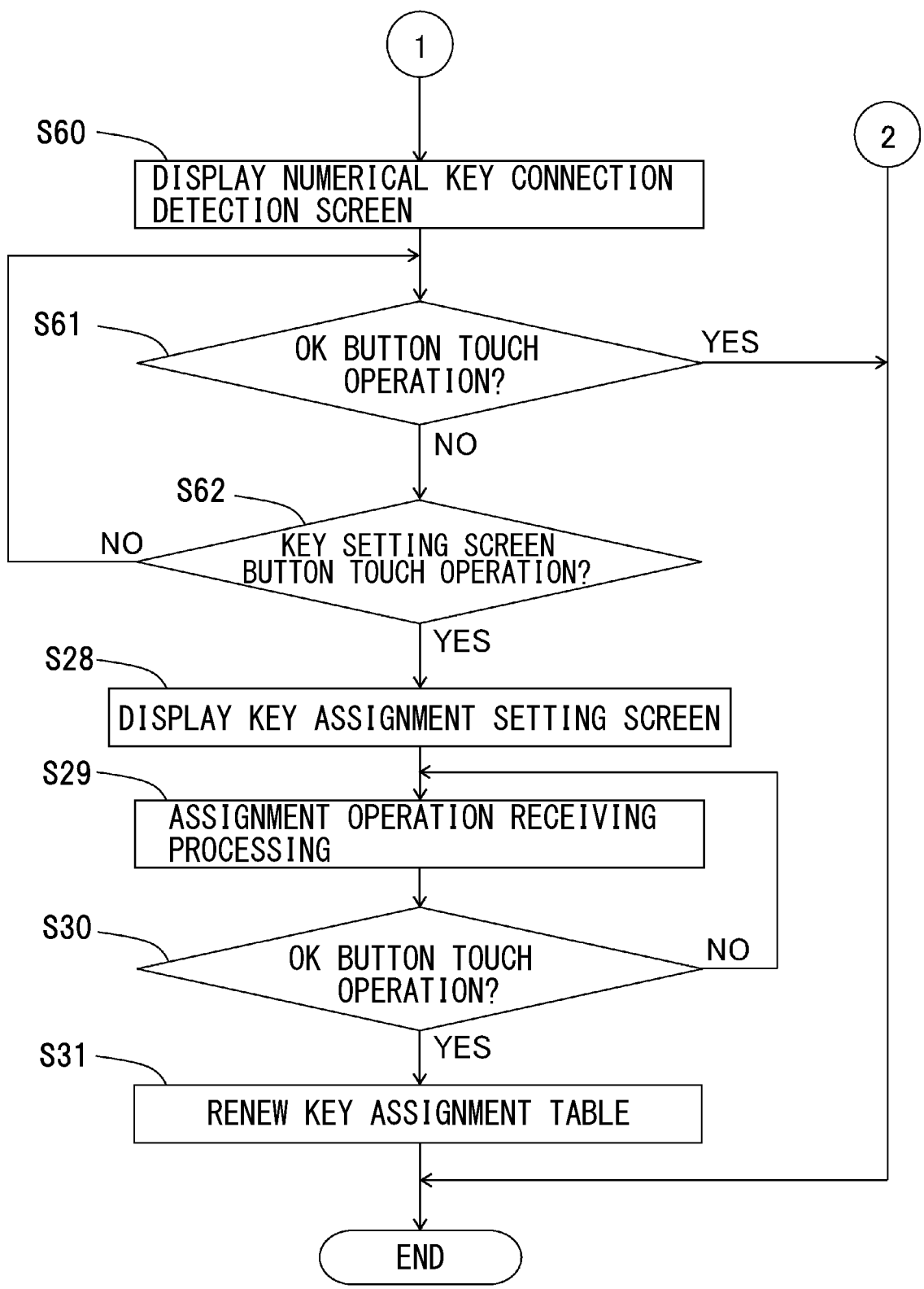
FIG. 16 is a flowchart showing the second half of the processing procedure in the case where the general-purpose numerical key unit is connected to the image forming apparatus according to the fifth embodiment.
Figure 17:
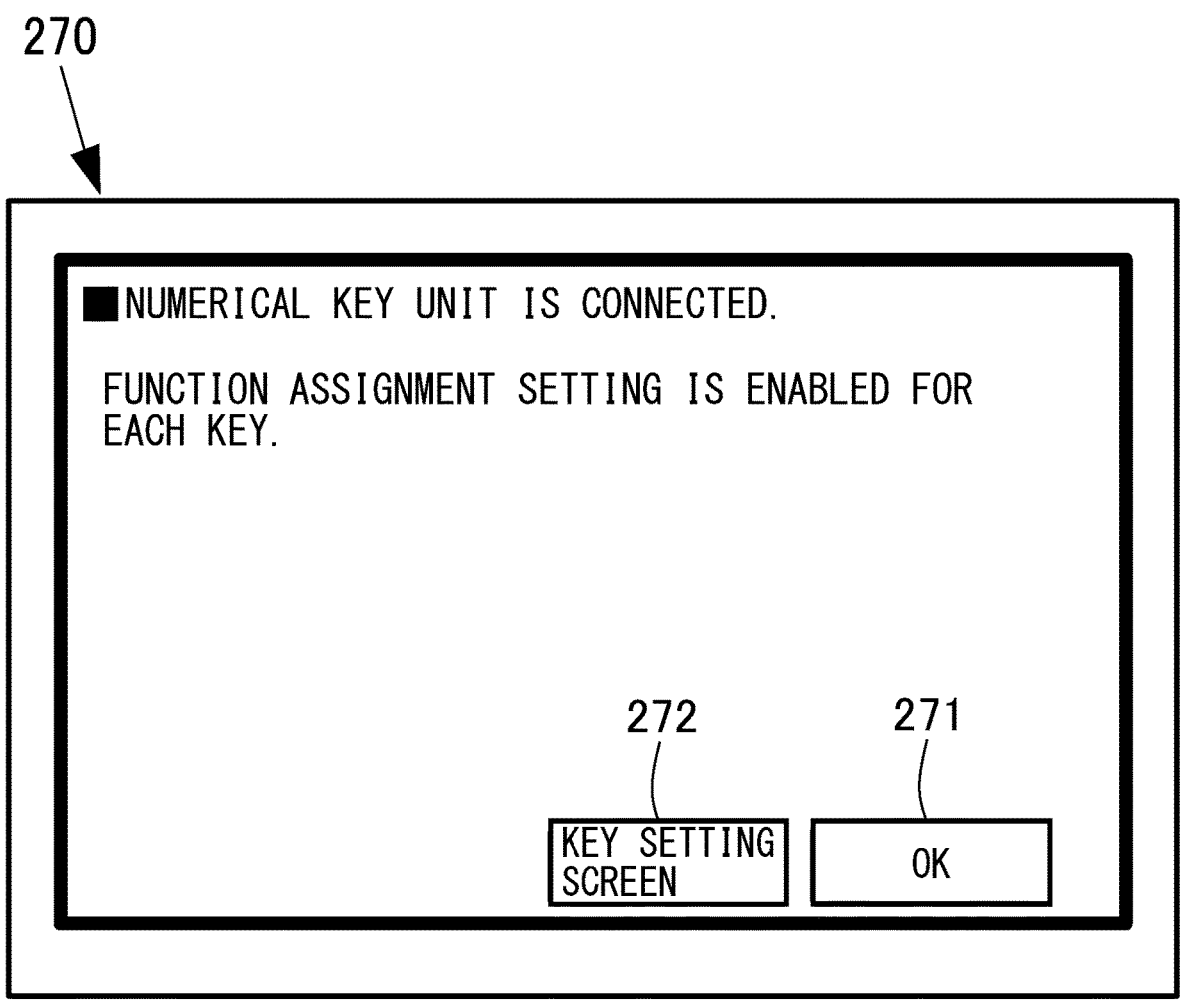
FIG. 17 is an illustration showing a numerical key connection detection screen of the image forming apparatus according to the fifth embodiment.

Next, a fifth embodiment of the present invention will be specifically described along flowcharts shown in FIGS. 15 and 16 and along FIG. 17. In this embodiment, a constitution is different from the constitution of the second embodiment in that in the case where the connection of the general-purpose numerical key unit 200 is detected, the controller 30 displays a message to the effect that key assignment setting is enabled. However, other constitutions are similar to those of the second embodiment, and therefore, reference numerals or symbols are made the same and detailed description will be omitted.

First, a processing procedure in the case where the general-purpose numerical key unit 200 is connected to the image forming apparatus 1 in this embodiment will be described along the flowcharts shown in FIGS. 15 and 16. Here, the steps S21 to S27 and the steps 28 to 31 of the flowcharts shown in FIG. 15 and FIG. 16 are similar to those shown in FIG. 12, respectively, in the second embodiment, and therefore, similar step numbers are added and will be omitted from description. Then, the controller 30 turns on the key assignment permission flag in order that the general-purpose numerical key unit 200 is connected and enablement of the key setting can be discriminated (step S27).

Then, the controller 30 displays a numerical key connection detecting screen 270 (see FIG. 17) (step S60). The controller 30 makes the display of the numerical key connection detecting screen 270, and shows a message to the effect that key assignment setting is enabled for the connection of the general-purpose numerical key unit 200. The controller 30 discriminates whether or not an OK button 271 of the numerical key connection detecting screen 270 is touch-operated (step S61). In the case where the controller 30 discriminated that the OK button 271 of the numerical key connection detecting screen 270 is touch-operated (YES of step S61), the controller 30 makes the numerical key connection detecting screen 270 non-display, and ends the processing. Thereafter, as in the third embodiment, the user is capable of voluntarily performing a key assignment setting operation.

In the case where the controller 30 discriminated that the OK button 271 of the numerical key connection detecting screen 270 is not touch-operated (NO of step S61), the controller 30 discriminates whether or not a key setting screen button 272 of the numerical key connection detecting screen 270 is touch-operated (step S62). In the case where the controller 30 discriminated that the key setting screen button 272 of the numerical key connection detecting screen 270 is not touch-operated (NO of S62), the controller 30 discriminates whether or not the OK button 271 is touch-operated again (step S61). In the case where the controller 30 discriminated that the key setting screen button 272 of the numerical key connection detecting screen 270 is touch-operated (YES of S62), the controller 30 executes processing similar to the steps S28 to S31 in the first embodiment.

As described above, according to the image forming apparatus 1 of this embodiment, in the case where the connection of the general-purpose numerical key unit 200 is detected, the message to the effect that setting of function assignment to the key is enabled. Then, the user is prompted to make the key setting by the power source, so that the user is caused to be capable of selecting whether the key setting is made immediately or the setting is not made once. For this reason, the user is capable of executing the key setting at a desired timing after the general-purpose numerical key unit 200 is connected, so that the operating property and the usability can be improved.

Other Embodiments

In the above-described embodiments, the case where to the keys displayed on the key kind display portion 252 (parts (a) and (b) of FIG. 10), functions of the image forming apparatus 1 can be assigned was described, but the present invention is not limited to this. For example, as regards the general-purpose numerical key units, those provided with keys which are not provided in the general-purpose numerical key units 200 in the above-described embodiments exist in many cases. For that reason, as regards the key kind display portion 252, a screen such that a new key is registered and displayed on the key kind display portion 252 and the function of the image forming apparatus 1 is assigned to the key may also be prepared. That is, the column of "key code" which is the first column of the key assignment table 260 (see FIG. 11) is prepared in advance in the image forming apparatus 1, but a constitution in which the key can be newly registered may also be employed. In that case, these is a need that a screen on which the key can be newly registered is prepared on the key assignment setting screen 250. As an example, a key code reading mode when the user pushes down the key of the general-purpose numerical key unit, such as preparation of a "key registration" button, and a constitution in which the read key code is named and displayed are needed. Further, for this key increased, there is a need that the key assignment table 260 increases a row and imparts function assignment information of the newly registered key. Thus, by preparing a setting screen, it becomes possible to meet various keys, so that it becomes possible to provide a more versatile key assignment function.

Further, in the above-described embodiments, the key assignment function is not particularly referred to, but a sing function may be assigned to a plurality of keys, or the single function may also be assigned to only a single key.

Further, the facsimile communication can be carried out via the modem 37 as shown in FIG. 2, and therefore, the image forming apparatus 1 is capable of inputting a line number. Further, when the line number is inputted, it is essential that "#" can be inputted, and as an example, key setting of "#" input may also be made essential. Or, in the case where the "#" input is not assigned to any key, only during the line number input, the "#" input may also be assigned temporarily to a key to which a function is not assigned and a message to that effect may be displayed on the screen.

Further, it would be considered that "−" is inputted for the line number input, and therefore, in the case where a function is assigned to "−", during the line number input, a function of temporarily disabling the input by the "−" key may also be provided. Particularly, when a "job start" function is assigned to the "−" key, it would be considered that the user erroneously pushes down the "−" key during the line number input and the facsimile transmission is started. In preparation for such a case, the "-" key is prevented from being subjected to assignment of "job start", or during the line number input, the "-" key may also be disabled.

Further, in the above-described embodiments, for example, in the general-purpose numerical key unit including the operation keys 205 shown in FIG. 5, it would be considered that the "Enter" key makes a strong impression of "job start" of the image formation or the like on some user. For that reason, as regards the function assignment to the "Enter" key, in order to avoid confusion with another function, a constitution in which only which one of "job start" or "no selection" can be selected may also be employed.

Further, in the above-described embodiments, the key setting to the functional key portion 207 of the general-purpose numerical key unit 200 is executed, but the present invention is not limited to this. For example, the present invention may also be similarly applied to a full keyboard also capable of character input.

Further, in the above-described embodiments, the case where the setting mode is executed by the controller 30 of the image forming apparatus 1 was described, but the present invention is not limited to this, for example, the setting mode may also be executed to the general-purpose numerical key unit 200 connected to the image forming apparatus 1 by utilizing a host computer connected to the image forming apparatus 1.

INDUSTRIAL APPLICABILITY

According to the present invention, the input device and the image forming apparatus capable of suppressing that in the image forming apparatus to which a plurality of input devices are connectable, in the case where a connected input device is operated, the input device malfunctions is provided.

The present invention is not restricted to the foregoing embodiment, but can be variously changed and modified without departing from the spirit and the scope of the present invention. Accordingly, the following claims are attached hereto to make public the scope of the present invention.

This application claims the Conventional Priorities from Japanese Patent Applications 2019-018769 filed Feb. 5, 2019, and 2019-018772 filed Feb. 5, 2019 all disclosure of which are incorporated by reference herein.

The invention claimed is:

1. An image forming apparatus comprising:
an image reading device configured to read an image of an original;
an image forming portion configured to form an image on a recording medium on the basis of a reading result of said image reading device;
an operating panel including a display screen capable of displaying, as software keys, a software numerical key portion for inputting each of numerical information of 0 to 9 and a software execution key portion for providing an instruction of a start of reading the image of the original to said image reading device;
a connecting portion to which a first input device including a first numerical key portion where a plurality of numerical keys for inputting numerical information of 0 to 9, respectively, by being pushed down as hardware keys are disposed in a telephone type arrangement and including a hardware execution key portion for providing an instruction of a start of reading the image of the original to said image reading device by being pushed down as the hardware keys, or a second input device including a second numerical key portion where a plurality of numerical keys for inputting numerical information of 0 to 9, respectively, by being pushed down as hardware keys are disposed in an electronic calculator type arrangement and including an arithmetic operation key portion for inputting data on four arithmetic operations by being pushed down as the hardware keys, is connectable; and
a controller configured to control said image forming apparatus so that an input operation by said first numerical key portion or said execution key portion is permitted in a case that said first input device is connected to said connecting portion, and so that an input operation by said second numerical key portion is permitted and an input operation other than the input operation by said second numerical key portion is made invalid.

2. An image forming apparatus according to claim 1, wherein said controller controls said image forming portion so as to start an image forming operation in response to pushing down of said hardware execution key.

3. An image forming apparatus according to claim 1, comprising a facsimile communication portion capable of transmitting and receiving facsimile,
wherein said controller controls said facsimile communication portion so that transmission of the facsimile is started by operation by said hardware execution key.

4. An image forming apparatus according to claim 1, wherein said controller is capable of executing a discrimination mode in which said controller discriminates whether said input device connected to said connecting portion is either of said first input device and said second input device, and
wherein said controller executes the discrimination mode in a case that a power source of said image forming apparatus is in an ON state and that said input device is connected to said connecting portion.

5. An image forming apparatus according to claim 1, wherein said controller is capable of executing a discrimination mode in which said controller discriminates whether said input device connected to said connecting portion is either of said first input device and said second input device, and
wherein said controller executes the discrimination mode in a case that a power source of said image forming apparatus is switched in state from an ON state to an OFF state.

6. An image forming apparatus according to claim 4, wherein said controller is capable of executing a setting mode in which setting for assigning predetermined processing to said arithmetic key portion is enabled in a case that said second input device is connected to said connecting portion in the discrimination mode.

7. An image forming apparatus according to claim 6, further comprising a storing portion for storing setting to said arithmetic key portion set in the setting mode.

8. An image forming apparatus according to claim 1, wherein said connecting portion is a connector of a USB standard.

9. An image forming apparatus according to claim 1, wherein an arrangement of said software numerical key portion is the same as the arrangement of said first numerical key portion.

10. An image forming apparatus according to claim 1, wherein said first input device or said second input device is provided on a right side with respect to said operating panel in a left right direction perpendicular to a front rear direction and a vertical direction of said image forming apparatus.

11. An image forming apparatus according to claim 1, further comprising a discharging portion, provided below said image reading device with respect to a vertical direction, for discharging the recording medium on which the image is formed by said image forming portion,
wherein said operating panel is provided above said discharging portion with respect to the vertical direction.

12. An image forming apparatus according to claim 1, further comprising a main assembly including said image forming portion therein,
wherein said operating panel is provided rotatably relative to said main assembly.

13. An image forming apparatus comprising:
an image reading portion configured to read an image of an original;
an image forming portion configured to form an image on a recording medium on the basis of a reading result of said image reading portion;
an operating panel including a display screen capable of displaying, as software keys, a software numerical key for inputting each of numerical information of 0 to 9, a numeric information input by the software numerical key, and a software execution key for inputting an instruction of a start reading the image of the original by said image reading portion; and a connecting portion to which a first input device or a second input device is connectable, said first input device including (1) a first numerical key where a plurality of numerical keys for inputting numerical information of 0 to 9, respectively, by being pushed down as hardware keys are disposed in a telephone type arrangement, and (2) a hardware execution key for inputting an instruction of a start reading the image of the original by said image reading portion by being pushed down as the hardware keys, said second input device including (a) a second numerical key where a plurality of numerical keys for inputting numerical information of 0 to 9, respectively, by being pushed down as hardware keys are disposed in an electronic calculator type arrangement, (b) an arithmetic operation key for inputting data on four arithmetic operations by being pushed down as the hardware keys, and (c) Enter key for inputting an instruction of an execution of an arithmetic based on information input by the plurality of numerical keys of said second input device and the four arithmetic operation key by being pushed down as the hardware keys, wherein said operating panel displays a numeric information input by said first numerical key of said first input device connected to said connecting portion on said display screen, and said image reading portion starts reading the image of the original based on the instruction input by the execution key of said first input device connected to said connecting portion, wherein said operating panel displays a numeric information input by said second numerical key of said second input device connected to said connecting portion on said display screen, and said image reading portion does not start reading the image of the original based on the instruction by the Enter key of said second input device connected to said connecting portion.

14. An image forming apparatus according to claim 13, wherein said operating panel displays a character on said display screen based on the instruction input by the Enter key of said second input device connected to said connecting portion.

15. An image forming apparatus according to claim 13, wherein said image reading portion does not start reading the image of the original based on the data by the arithmetic operation key of said second input device connected to said connecting portion.

16. An image forming apparatus according to claim 15, wherein said operating panel displays a character on said display screen based on the data input by the arithmetic operation of said second input device connected to said connecting portion.

17. An image forming apparatus according to claim 13, further comprising a discriminator configured to discriminate whether or not said first input device is connected to said connecting portion based on information acquired from an input device connected to said connecting portion.

18. An image forming apparatus according to claim 17, wherein said discriminator discriminates that said first input device is connected to said connecting portion in a case where information acquired from the input device connected to said connecting portion corresponds to said first input device, and discriminates that said second input device is connected to said connecting portion in a case where information acquired from the input device connected to said connecting portion does not correspond to said first input device.

19. An image forming apparatus according to claim 13, further comprising a controller configured to execute a setting mode in which setting for assigning predetermined processing to said arithmetic key portion is enabled in a case that said second input device is connected to said connecting portion.

20. An image forming apparatus according to claim 13, wherein said connecting portion is a connector of a USB standard.

21. An image forming apparatus according to claim 13, wherein an arrangement of said software numerical key portion is the same as the arrangement of said first numerical key portion.

22. An image forming apparatus according to claim 13, wherein said first input device or said second input device is provided on a right side with respect to said operating panel in a left right direction perpendicular to a front rear direction and a vertical direction of said image forming apparatus.

23. An image forming apparatus according to claim 13, further comprising a discharging portion, provided below said image reading portion with respect to a vertical direction, for discharging the recording medium on which the image is formed by said image forming portion, wherein said operating panel is provided above said discharging portion with respect to the vertical direction.

24. An image forming apparatus according to claim 13, further comprising a main assembly including said image forming portion therein, wherein said operating panel is provided rotatably relative to said main assembly.

25. An image forming apparatus according to claim 13, wherein a code corresponding to the instruction input by the hardware execution key of said first input device connected to said connecting portion is same as a code corresponding to the instruction input by the Enter key of said second input device connected to said connecting portion.

\* \* \* \* \*